(12) United States Patent
Odaka et al.

(10) Patent No.: US 7,953,571 B2
(45) Date of Patent: May 31, 2011

(54) SENSOR NETWORK SYSTEM FOR MANAGING THE LATEST DATA AND HISTORY DATA

(75) Inventors: Toshiyuki Odaka, Fuchu (JP); Keiro Muro, Koganei (JP); Minoru Ogushi, Kodaira (JP); Kei Suzuki, Kokubunji (JP); Shoji Suzuki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/882,213

(22) Filed: Jul. 31, 2007

(65) Prior Publication Data
US 2008/0071899 A1 Mar. 20, 2008

(30) Foreign Application Priority Data
Sep. 14, 2006 (JP) ................. 2006-249675

(51) Int. Cl.
*G06F 3/00* (2006.01)
(52) U.S. Cl. ......... 702/127; 702/182; 702/185; 702/188
(58) Field of Classification Search .................. 702/117, 702/121, 127, 182, 183, 188; 348/143; 715/716; 701/35
See application file for complete search history.

(56) References Cited

U.S. PATENT DOCUMENTS

| | | | |
|---|---|---|---|
| 6,850,252 B1 * | 2/2005 | Hoffberg | 715/716 |
| 6,892,131 B2 * | 5/2005 | Coffee et al. | 701/200 |
| 6,970,183 B1 * | 11/2005 | Monroe | 348/143 |
| 2003/0220704 A1 | 11/2003 | Nanbu et al. | |
| 2006/0142913 A1 * | 6/2006 | Coffee et al. | 701/35 |

FOREIGN PATENT DOCUMENTS

| JP | 2004-046780 | 11/2002 |
|---|---|---|
| JP | 2004-247785 | 2/2003 |

* cited by examiner

*Primary Examiner* — Eliseo Ramos Feliciano
*Assistant Examiner* — Felix E Suarez

(57) ABSTRACT

In a sensor network system comprising a sensor terminal and a management server, the sensor terminal transmits observation data acquired using the sensor, the management server has a latest data storage manager which manages the latest observation data among observation data received from the sensor terminal, a history data storage manager which manages the history of the observation data from any time when data was received from the sensor terminal to the latest observation data, and a missing data manager which manages missing history data, and compensates the missing history data based on a predetermined rule, and when a request for such observation data is received, at least one of the latest observation data managed by the latest data storage manager, and history data wherein the missing data has been compensated and managed by the history data storage manager, is output according to the type of request.

19 Claims, 22 Drawing Sheets

FIG. 2B

SENSOR NODE STORAGE DATA
(DATA STORAGE UNIT 206)

| Sequence # | Time Stamp | Observed Value |
|---|---|---|
| 0000 | 20060716T10:00:01 | 25.0, 60% |
| 0001 | 20060716T10:05:01 | 25.7, 58% |
| 0002 | 20060716T10:10:01 | 25.3, 58% |
| 0003 | 20060716T10:15:01 | 25.2, 61% |
| ⋮ | ⋮ | ⋮ |
| FFFF | 20060716T09:55:01 | 24.8, 59% |

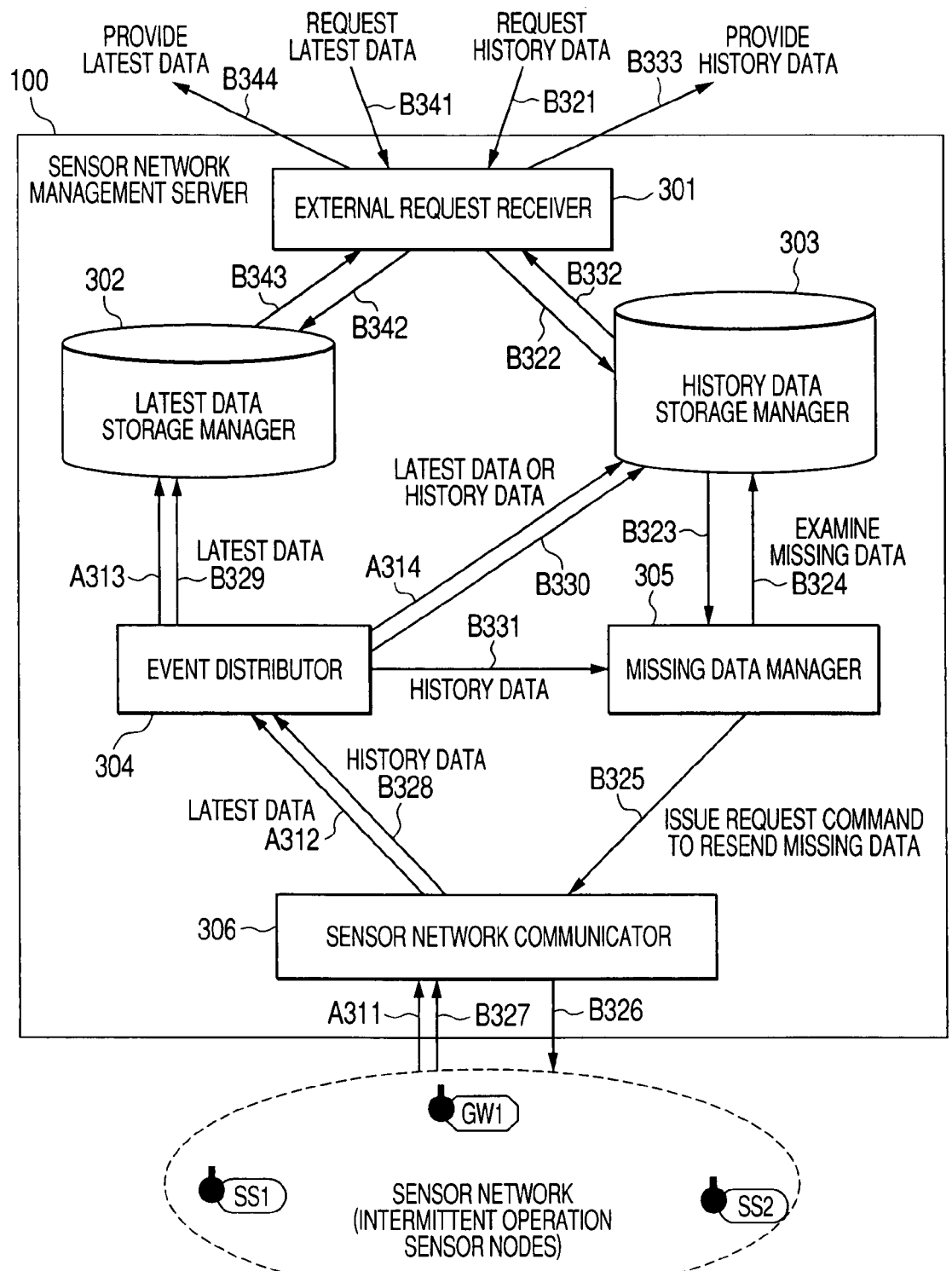

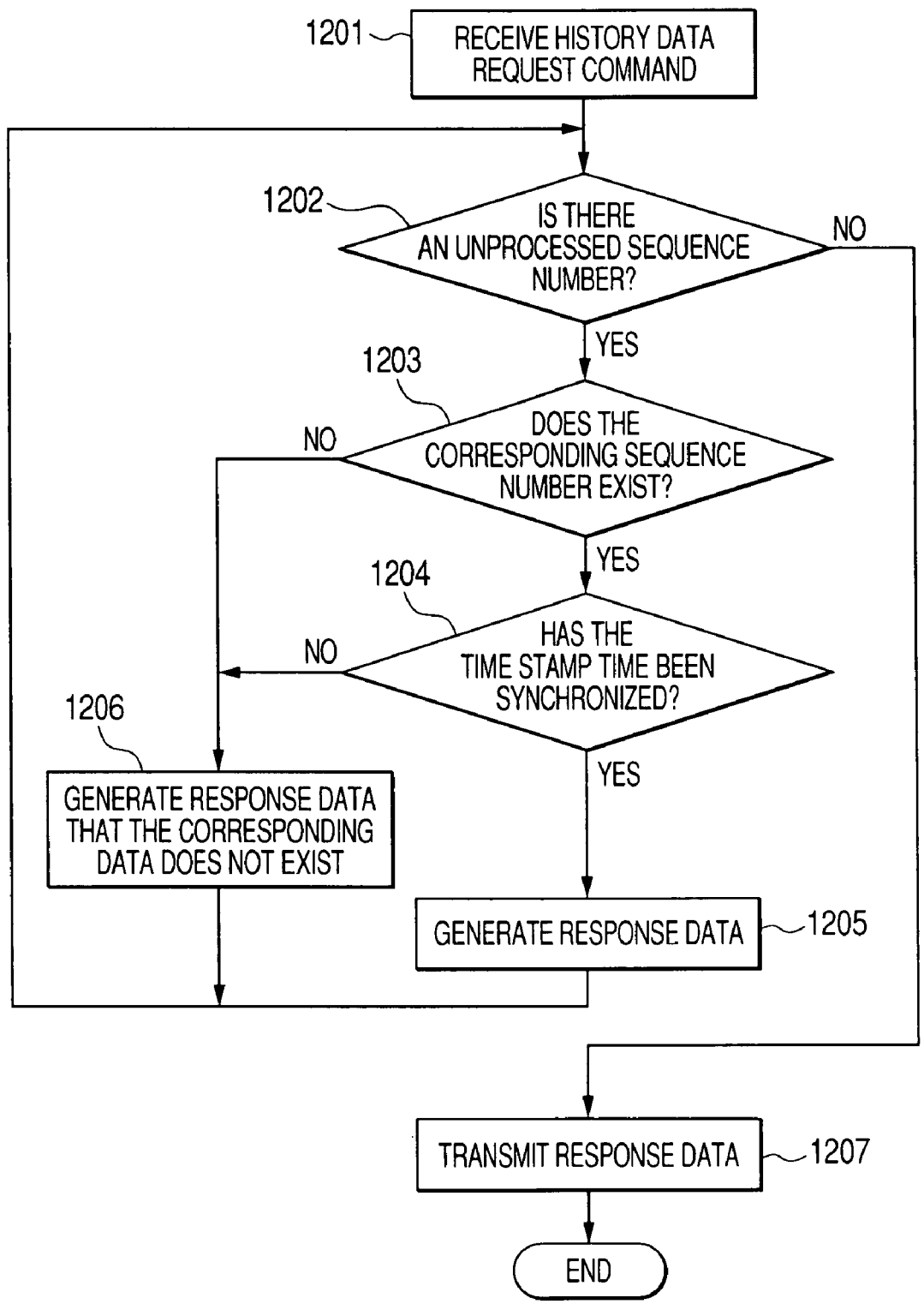

FIG. 13A
LATEST HISTORY DATA

| Node ID (IEEE Extended Address) [1301] | Time Stamp [1302] | Observed Value [1303] |
|---|---|---|
| 0001000200030004 | 2006/7/16 10:45:01 | 25.6°C, 61% |
| 0001000200030005 | 2006/7/16 10:40:52 | 25.5°C, 54% |
| 0001000200030006 | 2006/7/16 10:43:05 | 26.7°C, 63% |
| 0001000200030007 | 2006/7/16 09:39:18 | 26.8°C, 64% |
| 0001000200030008 | 2006/7/16 10:43:45 | 25.9°C, 60% |
| 0001000200030009 | 2006/7/16 10:44:32 | 24.9°C, 58% |

FIG. 13B
HISTORY DATA (Node ID="0001000200030004")

| Sequence # [1311] | Time Stamp [1312] | Observed Value [1313] |
|---|---|---|
| 0000 | 20060714T18:00:01 | 28.0°C, 60% |
| ⋮ | ⋮ | ⋮ |
| FFFE | 20060716T09:50:01 | 24.8°C, 59% |
| FFFF | 20060716T09:55:01 | 24.8°C, 59% |
| 0000 | 20060716T10:00:01 | 25.0°C, 60% |
| 0001 | 20060716T10:05:01 | 25.7°C, 58% |
| 0002 | 20060716T10:10:01 | 25.3°C, 58% |
| 0003 | 20060716T10:15:01 | 25.2°C, 61% |
| 0008 | 20060716T10:40:01 | 25.4°C, 60% |
| 0009 | 20060716T10:45:01 | 25.6°C, 61% |
| ⋮ | ⋮ | ⋮ |

EXAMPLE OF MISSING DATA
0004
0005
0006
0007

FIG. 14

EXAMPLE OF MISSING DATA SEQUENCE
NUMBER MANAGEMENT

| Node ID<br>(IEEE Extended Address) 1401 | MISSING SEQUENCE NUMBERS 1402 |
|---|---|
| 0001000200030004 | FF51<br>FFD7, FFD8<br>0004, 0005, 0006, 0007 |
| 0001000200030005 | 0201<br>0288, 0289 |

LATEST DATA DISPLAY SCREEN (TABULAR FORM)

| # | NODE DESIGNATION | TEMPERATURE (°C) | HUMIDITY (%) | OBSERVATION TIME |
|---|---|---|---|---|
| 1 | NO. 1 CONFERENCE ROOM | 25.6 | 61 | 2006/7/16 10:45:01 |
| 2 | NO. 2 CONFERENCE ROOM | 25.5 | 54 | 2006/7/16 10:40:52 |
| 3 | NO. 3 CONFERENCE ROOM | 26.7 | 63 | 2006/7/16 10:43:05 |
| 4 | LARGE CONFERENCE ROOM, EAST SIDE | 26.8 | 64 | 2006/7/16 09:39:18 |
| 5 | LARGE CONFERENCE ROOM, WEST SIDE | 25.9 | 60 | 2006/7/16 10:43:45 |
| 6 | CORRIDOR | 24.9 | 58 | 2006/7/16 10:44:32 |

1501, 1502, 1503, 1504, 1505

LATEST DATA DISPLAY SCREEN (MAP FORM)

FIG. 18

EXAMPLE OF XML DISPLAY OF
SINGLE OBSERVATION EVENT

```
<Event name="observed">
 <creator>
   <id type="MAC">0001000200030004</id>
   <timestamp>20060101T10:02:01</timestamp>
 </creator>
 <reporter>
   <id type="IP">133.xxx.yyy.zzz:5555</id>
 </reporter>
 <temperature>23</temperature>
 <sequenceNum>001F</sequenceNum>
</Event>
```

FIG. 19

EXAMPLE OF XML DISPLAY OF HISTORY
DATA REQUEST COMMAND

```
<nodeCommand>
 <getGatheredData>
   <id type="MAC">0001000200030004</id>
   <sequenceNum>0010</sequenceNum>
   <FromSequenceNum>0029</FromSequenceNum>
   <ToSequenceNum>002B</ToSequenceNum>
 </getGatheredData>
</nodeCommand>
```

FIG. 20

EXAMPLE OF XML DISPLAY OF BULK TRANSFER EVENT

```
<Event name="gathered">
 <creator>
   <id type="MAC">0001000200030004</id>
   <timestamp>20060101T10:04:03</timestamp>
 </creator>
 <reporter>
   <id type="IP">133.80.80.1:5555</id>
 </reporter>
 <hasItem>
   <Event name="observed">
     <sequenceNum>0010</sequenceNum>
   </Event>
   <Event name="observed">
     <temperature>23.0</temperature>
     <timestamp>20060101T10:00:01</timestamp>
     <sequenceNum>0029</sequenceNum>
   </Event>
   <Event name="observed">
     <temperature>22.0</temperature>
     <timestamp>20060101T10:01:01</timestamp>
     <sequenceNum>002A</sequenceNum>
   </Event>
   <Event name="observed">
     <temperature>24.0</temperature>
     <timestamp>20060101T10:02:01</timestamp>
     <sequenceNum>002B</sequenceNum>
   </Event>
 </hasItem>
</Event>
```

[WHEN THERE IS NO VALID DATA FOR SEQUENCE NUMBER "0010"]

FIG. 21A

SENSOR NODE STORAGE DATA PRIOR
TO TIME SYNCHRONIZATION
(DATA STORAGE UNIT 206)

| Sequence # (2101) | Time Stamp (2102) | Observed Value (2103) | Time_Sync_Flag (2104) |
|---|---|---|---|
| 0000 | 20000101T00:00:10 | 25.0, 60% | 0 |
| 0001 | 20000101T00:05:10 | 25.7, 58% | 0 |
| 0002 | 20000101T00:10:10 | 25.3, 58% | 0 |
| ⋮ | ⋮ | ⋮ | |
| | | | |
| | | | |

FIG. 21B

SENSOR NODE STORAGE DATA
AFTER TIME SYNCHRONIZATION
(DATA STORAGE UNIT 206)

| Sequence # (2101) | Time Stamp (2102) | Observed Value (2103) | Time_Sync_Flag (2104) |
|---|---|---|---|
| 0000 | 20060716T10:00:01 | 25.0, 60% | 1 |
| 0001 | 20060716T10:05:01 | 25.7, 58% | 1 |
| 0002 | 20060716T10:10:01 | 25.3, 58% | 1 |
| 0003 | 20060716T10:15:01 | 25.2, 61% | 1 |
| ⋮ | ⋮ | ⋮ | |
| | | | |

VIEW OF SENSOR NODE
(EXAMPLE OF OBSERVATION
VALUE DISPLAY)

VIEW OF SENSOR NODE
(EXAMPLE OF STORED DATA
NUMBER DISPLAY)

SENSOR NETWORK SYSTEM FOR MANAGING THE LATEST DATA AND HISTORY DATA

CLAIM OF PRIORITY

The present application claims priority from Japanese application JP 2006-249675 filed on Sep. 14, 2006, the content of which is hereby incorporated by reference into this application.

FIELD OF THE INVENTION

The present application relates to a sensor network system, and more particularly to a method of managing sensing data.

BACKGROUND OF THE INVENTION

In recent years, sensor network systems which comprise a sensor node and a sensor network management server are being developed. The sensor node observes a state (sensing data) of a man or a point etc., and transmits the observed sensing data to a sensor network management server. The sensor network management server performs various processing based on the received sensing data.

For the sensing data, only the latest values may be used, or history data at a previous fixed time may be used. For this purpose, techniques have been disclosed for managing the latest sensing data and historical sensing data (for example, refer to JP-A No. 2004-247785 and JP-A No. 2004-46780).

According to JP-A No. 2004-247785, a substation stores data with a time stamp with a predetermined frequency. A main station connects a circuit to the substation, and collects data stored by the substation. The main station determines whether there is any data missing based on a time stamp. When it determines that some data is missing, the main station collects the missing data from the substation by transmitting a time entry to the substation.

According to JP-A No. 2004-46780, a plant server holds stored information and a plant controller collects real-time information. A center server transmits either the stored information or real-time information to an end user terminal according to a request from an end user terminal.

SUMMARY OF THE INVENTION

A sensor node attached to a person or moving object usually operates by battery, and transmits data to a sensor network management server via a wireless channel.

In order to reduce costs resulting from battery replacement, it is desired to reduce the frequency of battery replacement by reducing the power consumption of the sensor node. Hence, it is desirable to shorten the time when the sensor node is operating as much as possible.

On the other hand, the quality of wireless communications may be dependent on various elements such as the spatial relationship of the sensor node and wireless station, and is therefore not constant. Hence, data transmitted from a moving sensor node may not reach the sensor network management server. As a result, there may be missing parts of the sensing data history. It may occur that due to the missing data, it is difficult to manage persons or objects to which the sensor node was attached.

For example, sensing data may be used in order to guarantee the quality of a product. In this case, it may be impossible to guarantee the quality due to the missing data. In order to specifically guarantee the quality of a product which changes with temperature, for example, it may be proven that the product is not exposed to temperatures outside a predetermined range. In this case, if a sensor node which measures the temperature of the product is attached, the quality of the product will be guaranteed by the sensing data history. However, if there is missing data, it may become impossible to guarantee the quality. Apart from this specific example, it may be difficult to manage an object to which or a person to whom a sensor node is attached due to the missing data.

Hence, in a process where the latest data is displayed in real-time, although it is unavoidable that some data cannot be displayed, data which does not have missing parts should be displayed as far as possible in the data history (such as daily reports).

Also, in a sensor network system, since there is a need to transmit phenomena observed by a sensor node in real-time, it is required to forward data in real-time without delaying observation information output by the sensor node as far as possible.

In order to prevent missing data, it is necessary to ensure data reaches the sensor network management server without fail. Usually, the transmitting source waits for an acknowledgement (ACK) from the transmission destination to ensure data transfer. If there is no ACK, the sensor node transmits the data again. However, if data is transmitted again while the sensor node waits for an ACK from the sensor network management server, it consumes power. It is therefore difficult to reduce the power consumption of the sensor node.

In the technique disclosed by JP-A No. 2004-247785, a substation transmits stored data when a circuit connection is made, and since it is not forwarded to the main station until it is compensated, it is lacking in real-time nature. Since compensated data is always forwarded, the latest data and history data cannot be distinguished.

Also, since it is the main station which controls the circuit connection to the substation, it is difficult to reduce the power consumption of the substation.

In the technique disclosed in JP-A No. 2004-46780, a plant forwards real-time information in response to a request from a user terminal, so this is also lacking in real-time nature. Further, since processing which compensates missing data is not performed, there may be data missing from the stored information.

The essential features of the invention disclosed in the present application may be briefly described as follows.

The sensor network system of the invention comprises a sensor terminal and a management server, wherein the sensor terminal transmits observation data acquired using the sensor, the management server has a latest data storage manager which manages the latest observation data among observation data received from the sensor terminal, a history data storage manager which manages the history of the observation data from any time when data was received from the sensor terminal to the latest observation data, and a missing data manager which manages missing history data, and compensates the missing history data based on a predetermined rule, and when a request for such observation data is received, at least one of the latest observation data managed by the latest data storage manager, and history data wherein the missing data has been compensated and managed by the history data storage manager, is output according to the type of request.

According to one embodiment of the invention, the power consumption of the sensor node can be reduced, the history of sensing data can be managed without losing data, and the latest sensing data can be provided.

BRIEF DESCRIPTION OF THE DRAWINGS

FIG. 2B is an example of a diagram of data stored in a data storage unit of a sensor node according to an embodiment of the invention;

FIG. 3 is an example of a schematic view of a sensor network management server and a diagram of data flow, in the case of acquiring history data with a user request as a trigger according to an embodiment of the invention;

FIG. 12 is an example of a flowchart of a history data request command response processing performed by a sensor node according to an embodiment of the invention;

FIG. 13A is an example of a diagram of a latest observation data managed by a sensor network management server according to an embodiment of the invention;

FIG. 13B is an example of a diagram of history data managed by a sensor network management server according to an embodiment of the invention;

FIG. 14 is an example of a diagram of data missing sequence numbers managed by the missing data manager according to an embodiment of the invention;

FIG. 18 is an example of a diagram of a single observation event handled in a sensor network management server according to an embodiment of the invention;

FIG. 19 is an example of a diagram of a history data request command handled in a sensor network management server according to an embodiment of the invention;

FIG. 20 is an example of a diagram of a bulk transfer event handled in a sensor network management server according to an embodiment of the invention;

FIG. 21A is an example of a diagram of data stored in a data storage unit of a sensor node before time synchronization processing is performed according to an embodiment of the invention;

FIG. 21B is an example of a diagram of data stored in a data storage unit of a sensor node after time synchronization processing was performed according to an embodiment of the invention;

DETAILED DESCRIPTION OF THE PREFERRED EMBODIMENTS

Figure 1:
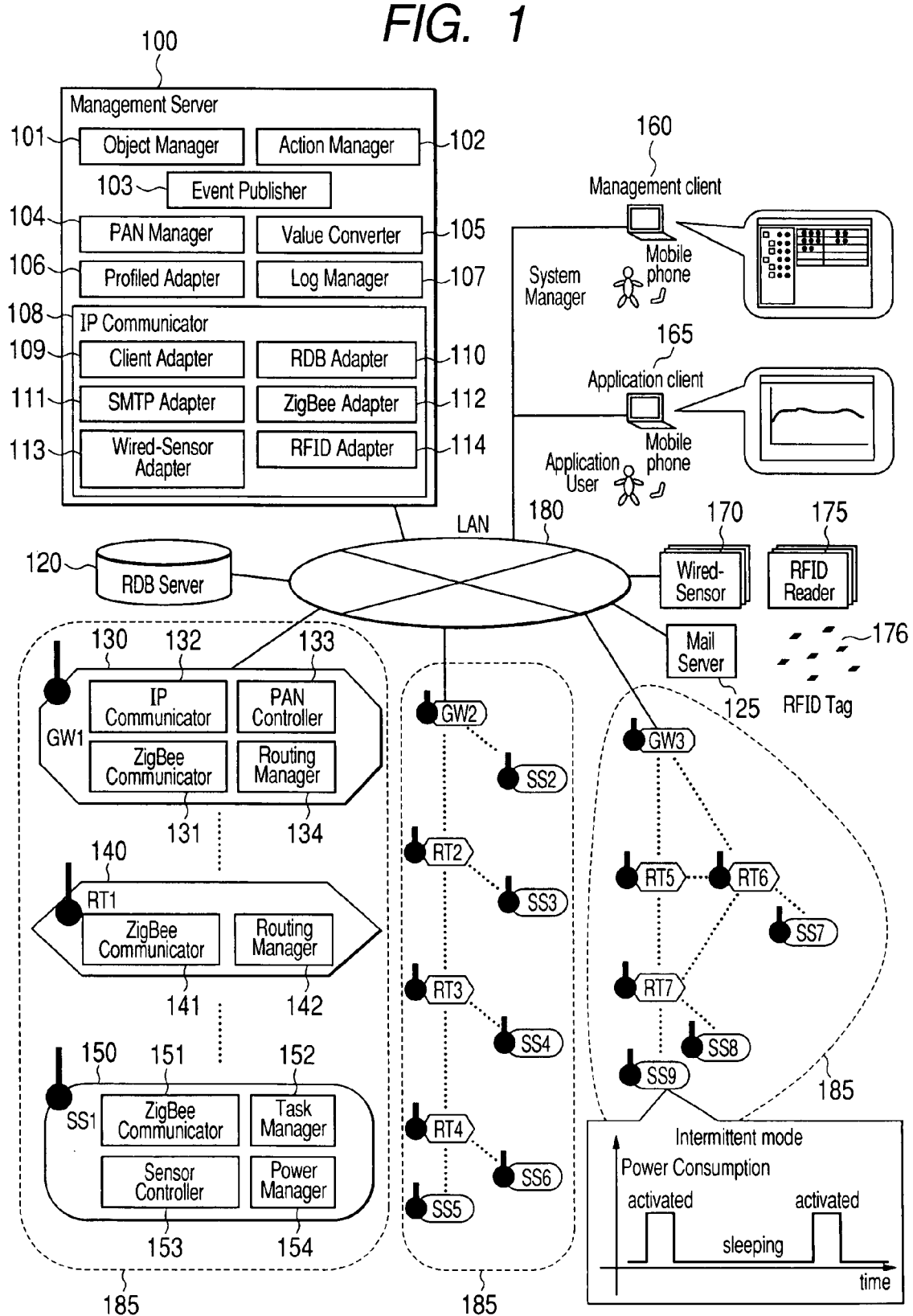
FIG. 1 is an example of a block diagram showing the construction of a sensor network system according to an embodiment of the invention.

Hereafter, one embodiment of the invention will be described referring to the drawings.

FIG. 1 is a block diagram showing the construction of a sensor network system according to an embodiment of the invention.

The sensor network system according to this embodiment comprises a sensor network management server 100, RDB (Relational Database) Server 120, mail server 125, gateway node 130, router node 140, sensor node 150, management client 160, operating client 165, wired-sensor 170, RFID reader 175 and IP (Internet Protocol) network 180.

The IP network 180 connects the sensor network management server 100, RDB server 120, mail server 125, gateway node 130, management client 160, operating client 165, wired-sensor 170, and RFID reader 175. The IP network 180 is a LAN (Local Area Network), for example.

The sensor nodes 150 are terminal units which are distributed and installed in the sensor network system of this embodiment. Although nine sensor nodes 150 (SS1 from SS9) are installed in the sensor network system of FIG. 1, any number may be installed. Each of the sensor nodes 150 is provided with a ZigBee communicator 151, task manager 152, sensor controller 153, and power manager 154.

The ZigBee communicator 151 communicates with the gateway node 130 or router node 140 using a ZigBee protocol. The task manager 152 changes information set by the corresponding sensor node 150 according to a request issued from the sensor network management server 100. A request means information for requesting a certain processing to the sensor node 150.

The sensor controller 153 observes environmental information using a sensor with which the corresponding sensor controller 153 is provided. The power manager 154 controls the power of the corresponding sensor node 150. For example, the power supply manager 154 starts the corresponding sensor node 150 by supplying power at a set waking interval.

The sensor node 150 observes environmental information using a sensor with which the corresponding sensor node 150 is provided. The observed environmental information may be temperature, humidity, acceleration, or any other physical quantity. The sensor node 150 transmits the observed environmental information to the sensor network management server 100 via a wireless network such as a PAN (Personal Area Network) 185 or the like as an observation event.

The sensor node 150 performs an intermittent operation (intermittent mode) which repeats an activated state and a sleeping state alternately. The sensor node 150 of this embodiment performs an intermittent operation at the predetermined interval based on a timing measured by the timer. In this case, the activated state corresponds to when the sensor is driven in order to observe environmental information, and when performing wireless communications for transmitting observation data. In this case, after terminating transmission of observation data, the sensor node 150 will be in the sleeping state. In the sleeping state, since all parts other than the timer in sensor node 150 stop, no parts other than the timer consume power. Hence, the power consumption of the sensor node 150 in the sleeping state is small as compared with the activated state.

In the following description, data including environmental information observed by the sensor node 150 is referred to as observation data. In addition to environmental information, observation data may also contain a time stamp and a sequence number (described hereafter). A set of observation data at any time from the past to the present, or a collection of this observation data, is referred to as history data.

The sensor node 150 of this embodiment not only transmits observation data by observing environmental information, but also stores the transmitted observation data as history data. When a command which requires history data is received, the requested history data is transmitted. The construction of the sensor node 150 will now be described in detail referring to FIG. 2A and FIG. 2B.

The router node 140 is provided with a ZigBee communicator 141 and routing manager 142. The ZigBee communicator 141 communicates with the gateway node 130, sensor node 150 or other router node 140 using a ZigBee protocol. The routing manager 142 determines the destination of information received from outside.

The router node 140 forms a wireless network and relays data communication between the sensor node 150, gateway node 130, or another router node 140. Specifically, the router node 140 receives environmental information observed by the sensor node 150, or a request from the sensor network management server 100, and forwards the request, etc., to the gateway node 130, sensor node 150 or other router node 140.

The gateway node 130 is provided with a ZigBee communicator 131, IP communicator 132, PAN controller 133, and routing manager 134.

The IP communicator 132 communicates with the sensor network management server 100 via the IP network 180. The routing manager 134 determines the destination of information received from outside. The ZigBee communicator 131 communicates with the router node 140 or sensor node 150 using a ZigBee protocol. The PAN controller 133 controls the PAN 185 which comprises the corresponding gateway node 130.

The gateway node 130 connects the IP network 180 to a low power wireless network, such as ZigBee. Specifically, the gateway node 130 receives environmental information observed by the sensor node 150 or a request issued by the sensor network management server 100. The request, etc., is forwarded to the sensor network management server 100, another gateway node 130, router node 140 or sensor node 150.

The PAN 185 is a wireless subnetwork formed of plural nodes. Usually, the gateway node 130 is a coordinator of the PAN 185 and manages each of the PAN 185. The PAN 185 has a tree structure as shown in "PAN 2" of FIG. 1, or may have a mesh structure as shown in "PAN3."

The sensor network management server 100 is a computer including an object manager 101, action manager 102, event distributor 103, PAN manager 104, value converter 105, profiled adapter 106, log manager 107, and IP communicator 108. The IP communicator 108 contains a client adapter 109, RDB adapter 110, SMTP adapter 111, ZigBee adapter 112, wired-sensor adapter 113, and RFID adapter 114.

The object manager 101 manages compositional information and various kinds of system parameters. For example, the object manager 101 updates information currently held based on various events received via the event distributor 103.

The action manager 102 manages various kinds of operation based on the observation results of the sensors.

The event distributor 103 handles observation data, etc., as events, and according to preset conditions, distributes events to each manager or value converter 105, or initiates an action.

The PAN manager 104 manages the state of the PAN 185.

The value converter 105 performs unit conversion of observation data distributed via the event distributor 103. The converted data may for example be returned to the event distributor 103.

The profiled adapter 106 manages a data interpretation rule for every application. The profiled adapter 106 converts a response to an event or a command from a node into a data format of a server, or converts a command to a node into a data format for wireless communications.

The log manager 107 manages log outputs such as various events (for example, observation data) from a node distributed via the event distributor 103, and a system operating state in the sensor network management server 100.

The IP communicator 108 is a component group for communicating with various clients or a server via the IP network 180.

The client adapter 109 provides an interface for the sensor network management server 100 to communicate with the management client 160 or operating client 165. The RDB adapter 110 provides an interface for the sensor network management server 100 to communicate with the RDB server 120. The SMTP adapter 111 provides an interface for the sensor network management server 100 to transmit an E-mail.

The ZigBee adapter 112 provides an interface for the sensor network management server 100 to communicate with the network based on ZigBee standard practice. The ZigBee adapter 112 conceals a protocol below a ZigBee network layer.

The wired-sensor adapter 113 provides an interface for the sensor network management server 100 to communicate with the wired-sensor 170. The wired-sensor adapter 113 conceals a protocol below a network layer of a wired-sensor 170 which is connected thereto. The wired-sensor adapter 113 is used in an application system wherein the wired-sensor 170 and wireless communication sensor node 150 are connected together.

The RFID adapter 114 provides an interface for the sensor network management server 100 to communicate with the RFID reader 175 or the RFID writer (not shown). The RFID adapter 114 conceals a protocol below a network layer of the RFID reader 175 which is connected thereto. The RFID adapter 114 is used in an application system wherein the RFID reader 175 and sensor node 150 are connected together.

A history of the environmental information observed by the sensor node 150 is stored in the RDB server 120. This history is stored for example in a hard disk drive managed by the RDB server 120, or another storage medium. The information stored in the RDB server 120 will be described later in detail referring to FIG. 13B.

The management client 160 is a computer operated by the manager of the sensor network system. The management client 160 transmits various requests to the sensor network management server 100 when there is an operation by the manager.

The operating client 165 is a computer operated by the client of a sensor network system. The operating client 165 performs various applications.

The operating client 165 receives environmental information observed by the sensor node 150 from the sensor network management server 100. The operating client 165 performs various processing based on the received environmental information.

At least one of the management client 160 or operating client 165 can request observation data from the sensor network management server 100. These clients may display observation data acquired from the sensor network management server 100.

The wired-sensor 170 observes environmental information, and the wired-sensor 70 transmits the observed environmental information to the sensor network management server 100 via the IP network 180.

The RFID reader 175 reads the RFID 176 and transmits the read result to the sensor network management server 100 via the IP network 180.

Figure 2A:
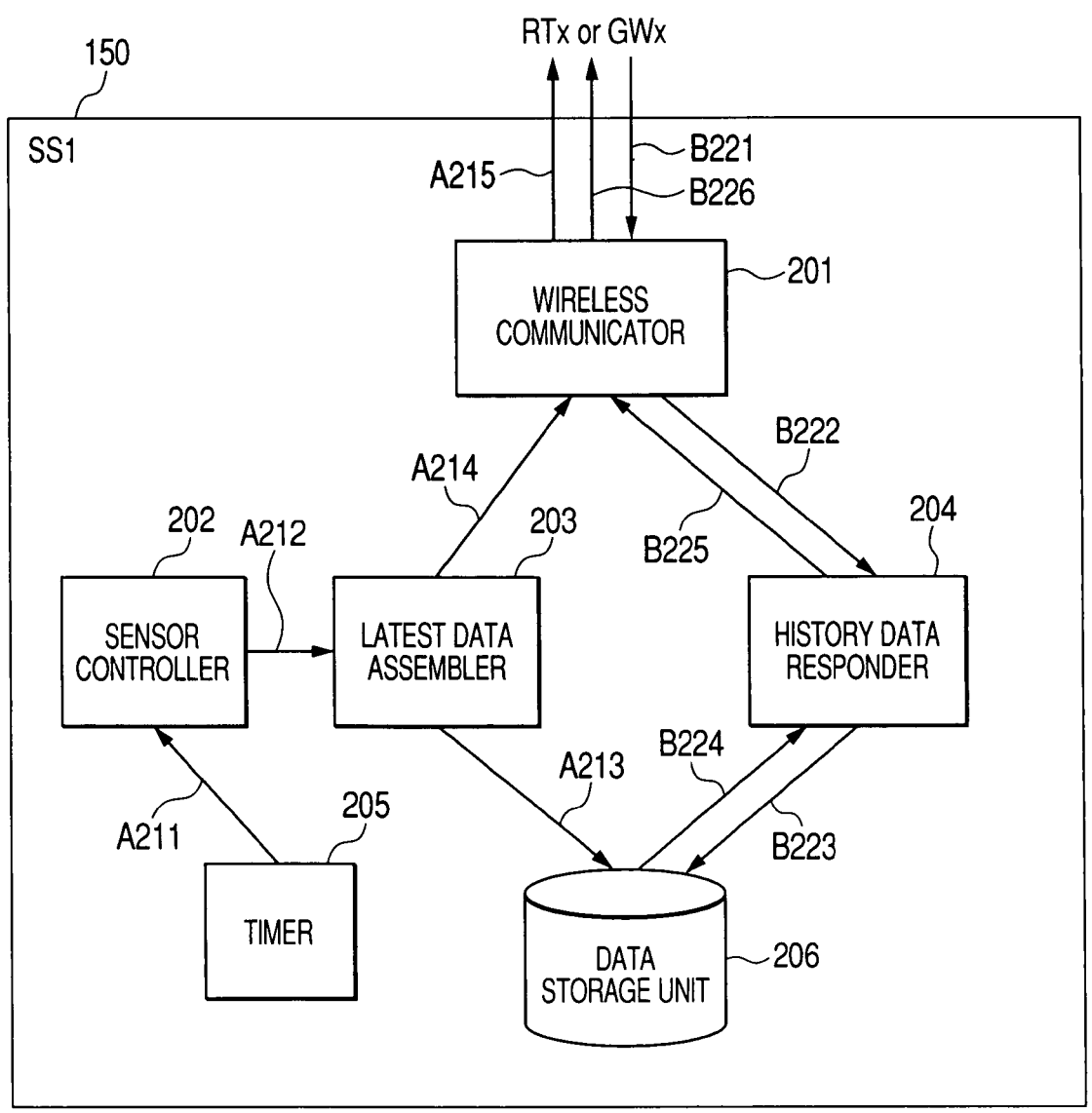
FIG. 2A is an example of a schematic view of a sensor node and a diagram of data flow according to an embodiment of the invention.

FIG. 2A is a schematic view of the sensor node 150 and the data flow according to an embodiment of the invention.

The sensor node 150 of this embodiment comprises a wireless communicator 201, sensor controller 202, latest data assembler 203, history data responder 204, timer 205, and data storage unit 206. The wireless communicator 201 corresponds to the ZigBee communicator 151 of FIG. 1. The sensor controller 202 corresponds to the sensor controller 153 of FIG. 1. The latest data assembler 203, history data responder 204, and data storage unit 206 are equivalent to the task manager 152 of FIG. 1. History data is stored in the data storage unit 206. The history data stored in the data storage unit 206 will be described later in detail referring to FIG. 2B. The data storage unit 206 is a nonvolatile memory, such as an EEPROM.

Next, the processing performed by the sensor node 150 will be described step by step.

The sensor node 150 can observe environmental information autonomously (i.e., without receiving a request from other nodes or servers, etc.), and can transmit observation data to the sensor network management server 100. The sensor node 150 can also transmit stored observation data to the management server 100 according to a request from the sensor network management server 100.

Steps A211 to A215 of FIG. 2A show the processing when the sensor node 150 observes environmental information autonomously until observation data including the observed values are shown.

The timer 205 measures a time or an interval, and transmits instructions to the sensor controller 202 at a predetermined timing (step A211). For example, the timer 205 may transmit instructions at a predetermined time, or may transmit instructions at a predetermined interval.

Environmental information (for example, temperature and humidity) are observed, and if an instruction from the timer 205 is received, the sensor controller 202 transmits the observed environmental information to the latest data assembler 203 (step A212).

The latest data assembler 203 generates observation data including the received environmental information, and stores the observation data in the data storage unit 206 (step A213). A time stamp which shows the time when environmental information was observed, and a sequence number which shows an observed order, are assigned to data stored at this time (FIG. 2B).

Next, the latest data assembler 203 transmits the received observation data (i.e., the same observation data as what was stored in data storage unit 206 in step A213) to the wireless communicator 201 (step A214).

The wireless communicator 201 transmits the received observation data to the router node 140 or gateway node 130 by wireless (step A215). The transmitted observation data, when received by the router node 140 or gateway node 130, reaches the sensor network management server 100 via the IP network 180. However, neither the router node 140 nor gateway node 130 may be able to receive the observation data. In this case, the observation data transmitted from the wireless communicator 201 does not reach the sensor network management server 100.

In the following description, the observation data transmitted in the step A215 includes also real-time data.

The real-time data transmitted from the sensor controller 202 is stored in the data storage unit 206, and transmitted from the wireless communicator 201.

Steps B221 to B226 of FIG. 2A show the processing when the sensor node 150 receives a command from the sensor network management server 100, and transmits the stored data.

First, the wireless communicator 201 receives a command for acquiring history data from the sensor network management server 100 (step B221). This command is transmitted from the sensor network management server 100, and arrives at the wireless communicator 201 via the IP network 180 and gateway node 130. This command may also pass through one or more of the router nodes 140.

Next, the wireless communicator 201 transmits a received command to the history data responder 204 (step B222).

The history data responder 204, according to the received command, transmits a data read command to the data storage unit 206 (step B223), and acquires stored data (step B224).

Next, the history data responder 204 transmits the acquired data to the wireless communicator 201 (step B225).

The wireless communicator 201 transmits data received from the history data responder 204 to an upper node as history data (step B226). When plural observation data is requested in the step B221, in the step B226, the requested plural observation data is transmitted together.

When neither the processing from the step A211 to A215, nor the processing from the step B221 to B226 is performed, the sensor node 150 is in a sleeping state. Since parts other than the timer 205 stop at this time, power is not consumed.

FIG. 2B is a diagram of the data stored in the data storage unit 206 of the sensor node 150 according to an embodiment of the invention.

The data stored in the data storage unit 206 includes at least the sequence number 207, time stamp 208 and observed value 209.

The sequence number 207 is a number assigned to the sequence in which each of the observed values 209 was observed, in order to identify each observed value 209. In the example of FIG. 2B, the sequence number 207 is displayed in hexadecimal format.

The time stamp 208 shows the time at which each of the observed values 209 was observed.

The observed value 209 is a value of the environmental information observed by a sensor (sensor 1103 of FIG. 11) with which the sensor node 150 is provided. In this embodiment, although temperature and humidity are observed as environmental information, other environmental information may be observed.

In the example of FIG. 2B, "20060716T10:00:01" and "25.0 or 60%" are stored, respectively as the time stamp 208 and observed value 209 corresponding to the value "0000" of the sequence number 207. This shows that the temperature and humidity which were observed at 10:00:01 second on Jul. 16, 2006 were 25.0° C. and 60%, respectively.

In the example of FIG. 2B, "20060716T10:05:01" and "25.7 or 58%" are respectively stored as the time stamp 208 and observed value 209 corresponding to the value "0001" of the sequence number 207. The fact that the value of the sequence number 207 is "0001" shows that the observed value 209 corresponding to this sequence number was observed following the observed value 209 corresponding to the sequence number "0000." Hence, after 10:00:01 seconds on Jul. 16, 2006, environmental information was next observed at 10:05:01 seconds on Jul. 16, 2006, and the temperature and humidity which were then observed were 25.7° and 58%, respectively.

Hence, environmental information observed at each time is stored in the observed sequence, and, as a result, a predetermined number of the observed values 209 are stored in the data storage unit 206. In the example of FIG. 2B, 65536 sets of the observed values 209 (temperature and humidity) are stored when the sequence number 207 runs from "0000" to "FFFF".

The data storage unit 206 corresponds to a nonvolatile memory 1104 (refer to FIG. 11), as described later. Hence, the observation data shown in FIG. 2B is stored in the nonvolatile memory 1104.

The capacity (i.e., the amount of observation data which can be stored in the data storage unit 206) of the data storage unit 206 is determined based on a user request and permitted cost. The data per record includes for example the 16 bit sequence number 207, 32-bit time stamp 208 and 16 bit observed value 209. Here, the records are observation data corresponding to one sequence number 207. When the observed value of one record contains plural types of physical quantity (for example, temperature and humidity), 16 bits at a time may be allocated to each physical quantity.

When the sensor node 150 is provided with plural sensors having different observation gaps, an independent sequence number 207 and time stamp 208 are assigned to the observed values observed by each sensor. It is desirable also that the regions where each observation data is stored are independent.

On the other hand, when plural sensors function with an identical timing, the value observed by those sensors may be managed by the common sequence number 207 and common time stamp 208. In the example of FIG. 2B, "temperature" and "humidity" are managed by the common sequence number 207 and common time stamp 208.

The data storage unit 206 is implemented in ring buffer form. Hence, when environmental information was stored in all entries having a sequence number 207 running from "0000" to "FFFF", the environmental information observed next is again stored in the observed value 209 of an entry whose sequence number 207 is "0000." The environmental information observed after that is sequentially stored in the entry whose sequence number 207 is "0001" and subsequent entries.

In the example of FIG. 2B, "20060716T09:55:01" and "24.8 or 59%" are stored, respectively as the time stamp 208 and observed value 209 corresponding to the value "FFFF" of the sequence number 207. This shows that in the example of FIG. 2B, the observed value 209 corresponding to the sequence number "0000" was observed following the observed value 209 corresponding to the sequence number "FFFF".

When a history data request command, described later, is received, the sensor node 150 reads the requested history data from the data storage unit 206, and transmits it. When the history data request command specifies the sequence number 207, the time stamp 208 and observed value 209 corresponding to the specified sequence number 207 are transmitted as history data.

Next, the construction and processing of the sensor network management server 100 will be described.

The sensor network management server 100, when data transmitted from the sensor node 150 is received, stores this data as the latest data, and stores the same data as history data. When the latest data is requested by a user, the sensor network management server 100 provides the latest data, and when history data is requested by a user, it provides the history data. The user is a manager who operates the management client 160, or a user who operates the operating client 165, for example.

As described already, data transmitted from the sensor node 150 does not always reach the sensor network management server 100. Hence, some data may be missing from the history data. The sensor network management server 100 determines whether or not there is data missing from the history data. When there is missing data, the sensor network management server 100 requests the sensor node 150 to retransmit the missing history data.

Figure 5:
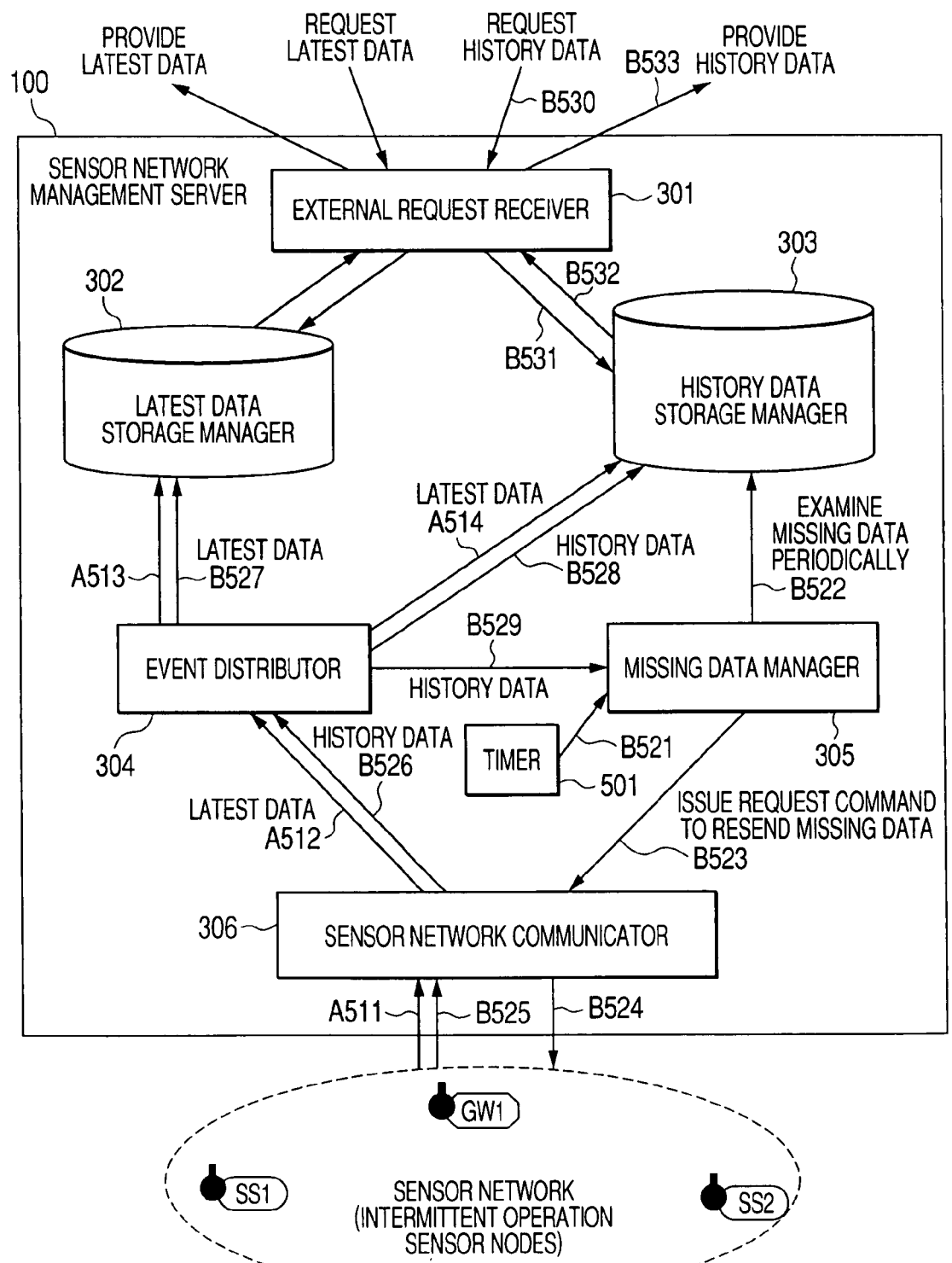
FIG. 5 is an example of a schematic view of a sensor network management server and a diagram of data flow when history data is acquired with a time entry as a trigger according to an embodiment of the invention.
Figure 6:
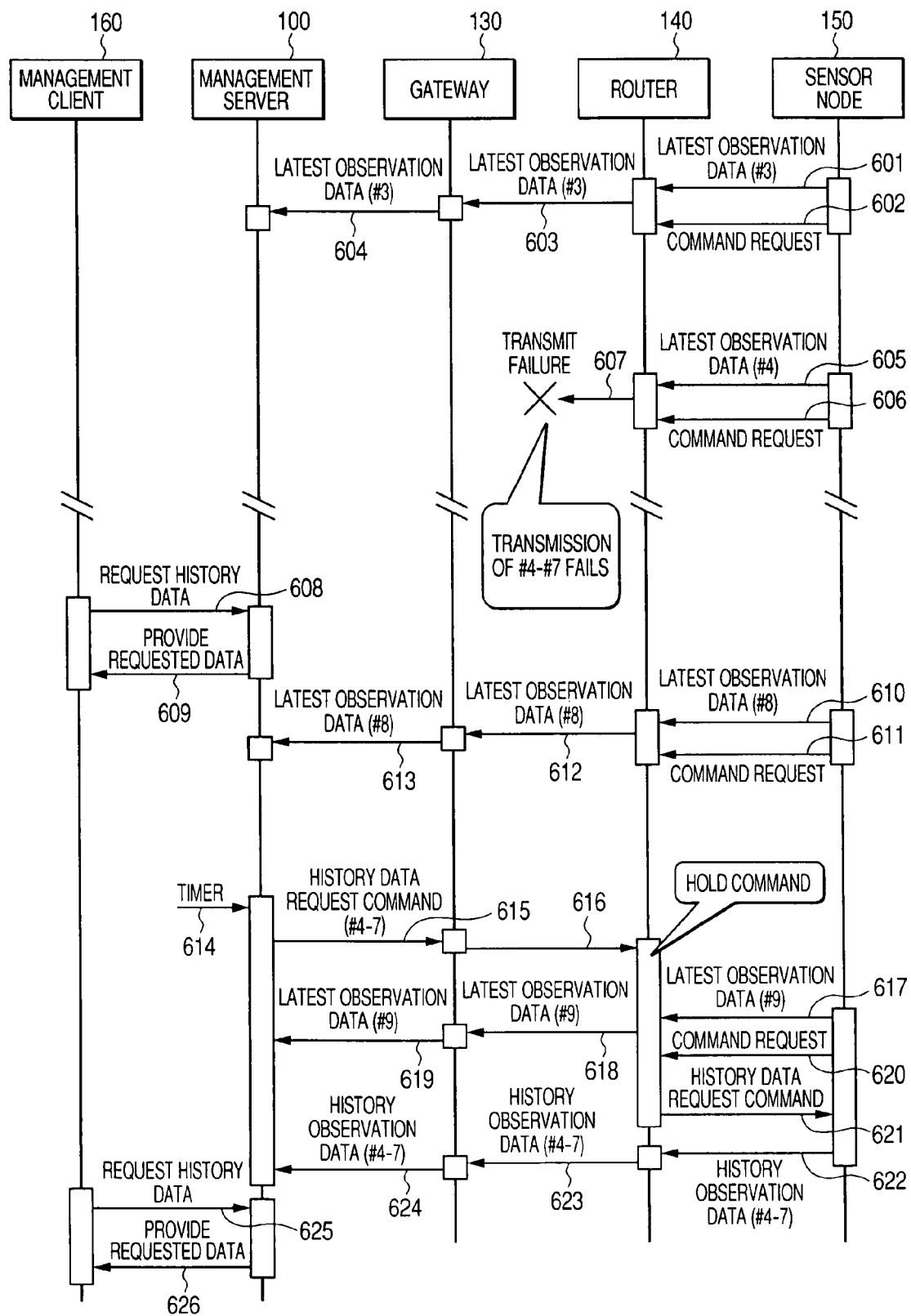
FIG. 6 is an example of a diagram of a command issue sequence of processing performed with a time entry as a trigger according to an embodiment of the invention.
Figure 9:
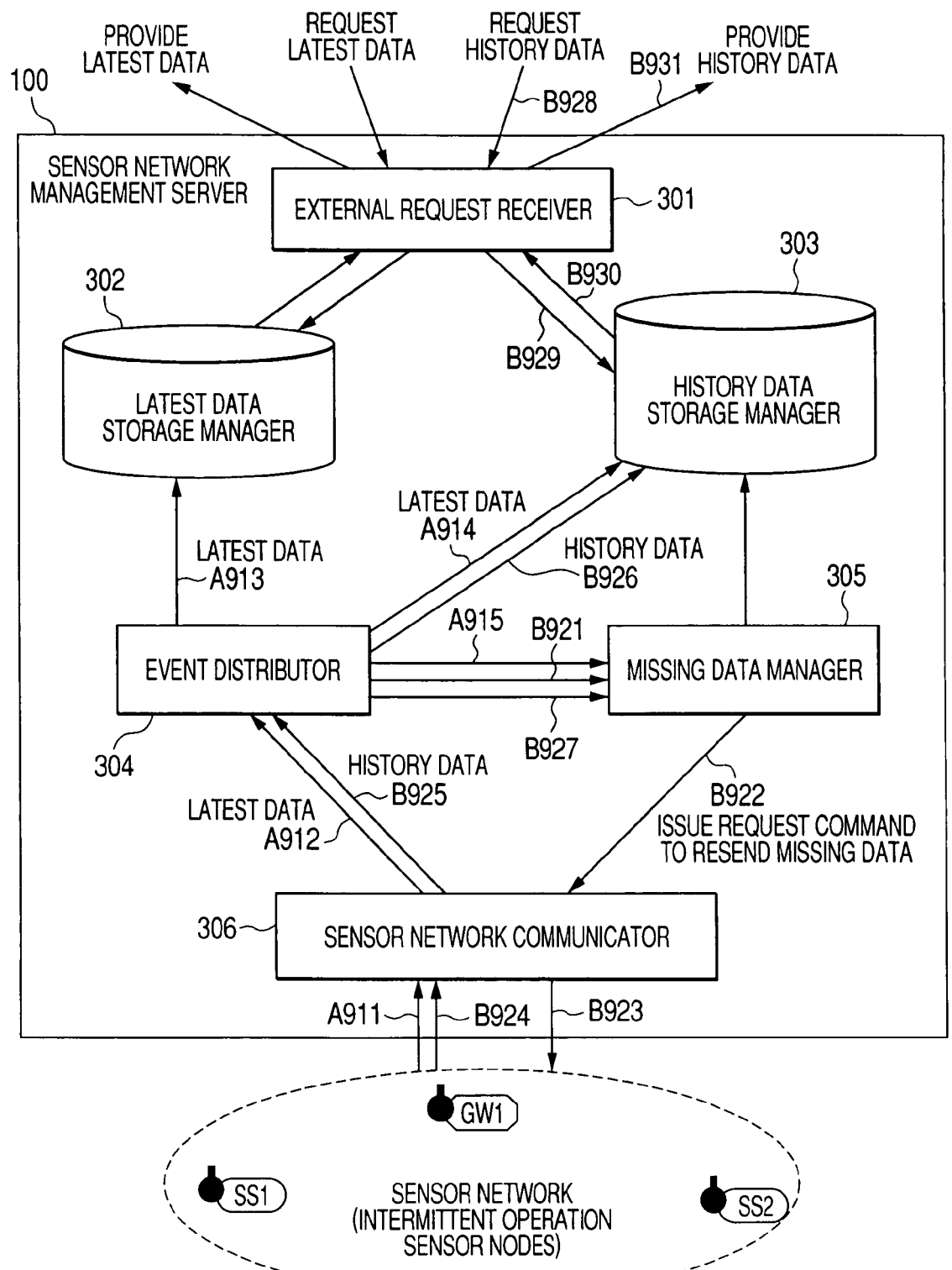
FIG. 9 is an example of a schematic view of a sensor network management server and a diagram of data flow when history data is acquired with a sequence number as a trigger according to an embodiment of the invention.
Figure 10:
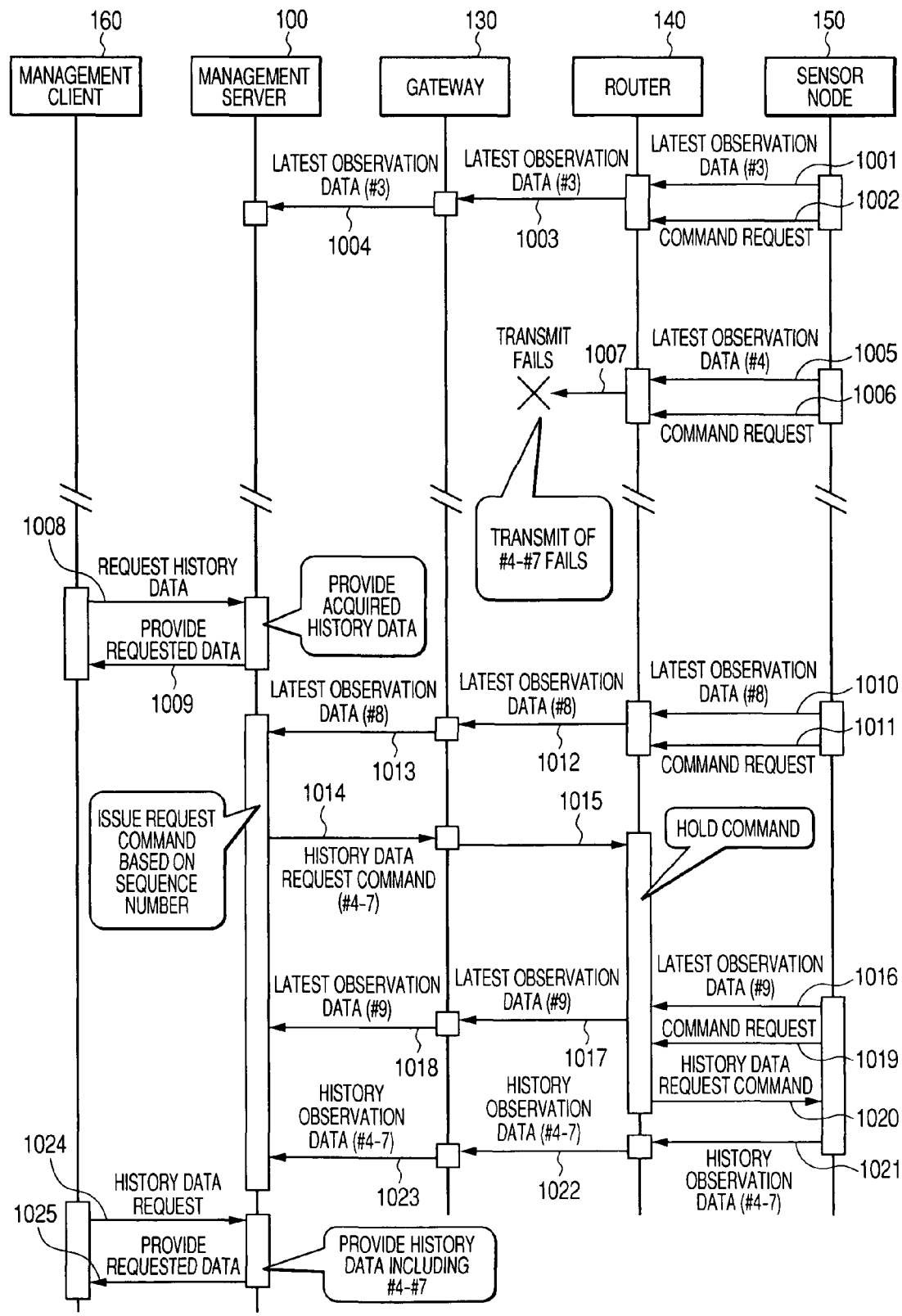
FIG. 10 is an example of a diagram of a command issue sequence of processing performed with a sequence number as a trigger according to an embodiment of the invention.

The determination of missing data and a resending request may be performed at any time. For example, this processing may be performed when history data is required by a user, (FIGS. 3 and 4), or it may be performed at a periodical or predetermined time (FIGS. 5 and 6). Alternatively, this processing may be performed based on the result of a heartbeat surveillance (FIGS. 7 and 8), or it may be performed based on a sequence number (FIGS. 9 and 10). It is also possible to combine the determination of this missing data with the processing of a resend request.

The sensor network system is used for example by an on-site inspector for managing the environment in a food factory, or managing the environment in a facility for facility management. In that case, it is important for the site inspector to acquire environmental information in real-time as far as possible, and to perform suitable line management. When the temperature shows abnormalities due to an air-conditioning fault or fire outbreak, for example in a food factory, it is important to notify the inspector of the information observed by a sensor node in real-time. On the other hand, to guarantee the quality of foodstuffs, such as when a food factory manager grasps a food management state and creates a daily report, or in order for a facility manager to report the management state of the facility, reliable history data which is free of gaps as far as possible, is required. Hence, according to the invention, the real-time data transmitted from the sensor node 150 is stored in either a latest data storage manager or a history data storage manager by different management methods, and the desired data can be provided according to a display request for latest observation data or history data from the user.

This embodiment uses observation data stored in the latest data storage manager and the history data storage manager according to the type of display request from the user. A user request may specify which of the data stored in the two kinds of data storage manager is to be used. For example, a menu which can specify display formats, such as a menu according to the user's purpose such as "on-site understanding" and "daily report creation" or graphical representation, or a GUI which is easy for a user to use, can be shown, and this menu can be associated with the two kinds of data storage managers in the sensor network management server. In this case, the sensor network management server holds a table which associates the menu with the two kinds of data storage manager. Thereby, the sensor network management server looks up the table according to a user request, so only observation data managed by the latest data storage manager, only observation data managed by the history data storage manager, or observation data stored in the latest data storage manager and the history data storage manager, can be used as may be appropriate. The display format of observation data is described in FIG. 15A-FIG. 17B.

FIG. 3 is a schematic view of the sensor network management server 100 and the data flow when history data is acquired with a user request as a trigger according to an embodiment of the invention.

The sensor network management server 100 comprises an external request receiver 301, latest data storage manager 302, history data storage manager 303, event distributor 304, missing data manager 305, and sensor network communicator 306.

The external request receiver 301 corresponds to the client adapter 109. The object manager 101 corresponds to the latest data storage manager 302. The latest data storage manager 302 contains a memory (for example, Random Access Memory) (not shown) for storing the latest observation data. The history data storage manager 303 corresponds to the RDB adapter 110 and RDB server 120. The event distributor 304 corresponds to the event distributor 103. The missing data manager 305 corresponds to part of the PAN manager 104. The sensor network communicator 306 corresponds to the profiled adapter 106 and ZigBee adapter 112.

Steps A311-A314 of FIG. 3 show the processing performed by the sensor network management server 100 which received observation data (in this case, real-time data) from the sensor node 150. The received observation data contains environmental information observed by the sensor node 150.

In the description of FIG. 2A, the intermittent operation of each of the sensor node 150 is performed with autonomous timing, and it transmits observation data as real-time data.

First, the sensor network communicator 306 receives observation data transmitted as real-time data from the sensor node 150 (step A311).

Next, the sensor network communicator 306 transmits the received observation data to the event distributor 304 (step A312).

The event distributor 304 transmits the received observation data to the latest data storage manager 302 (step A313). As a result, the received observation data is stored in the memory of the latest data storage manager 302 as the latest observation data. When the immediately preceding observation data is stored in the memory of the latest data storage manager 302, when the latest observation data is stored, the immediately preceding observation data may be deleted.

The observation data transmitted from the sensor node 150 does not always reach the sensor network management server 100. Hence, observation data which is transmitted from the sensor node 150 last, is not necessarily stored in the latest data storage manager 302. However, the sensor network management server 100 handles data (i.e., real-time data received last by the sensor network management server 100 from the sensor node at the present time) stored in the latest data storage manager 302 as the latest observation data. The latest data storage manager stores the latest observation data for each sensor node.

The event distributor 304 transmits the received observation data (i.e., the same data as what was transmitted in step A313) to the history data storage manager 303 (step A314). As a result, the received observation data is stored by the history data storage manager 303. Specifically, the observation data is stored in a database managed by the RDB server 120. At this time, the last observation data is not deleted from the database. All the observation data received in the past may be stored in the database as history data, or a predetermined number of observation data may be stored therein as history data. When a predetermined number of observation data is stored in the database and the latest observation data is stored, the oldest observation data already stored may be deleted.

Real-time data transmitted from the sensor node 150 is stored in a memory managed by the latest data storage manager 302 as the latest observation data, and is further stored in a database managed by the history data storage manager 303 as history data. Previous observation data is also further stored in a database as history data. An example of observation data stored in the memory and database will be described in detail later (see FIGS. 13A and 13B).

Steps B321-B333 in FIG. 3 show the processing performed by the sensor network management server 100 when history data was requested by the user.

First, the external request receiver 301 receives a request for history data from the user (step B321).

Next, the external request receiver 301 transmits the received request to the history data storage manager 303 (step B322).

The history data storage manager 303 which received the request from the external request receiver 301 requests the missing data manager 305 to examine whether or not there is any data missing from the history data (step B323). The missing data manager 305 examines whether or not there is any data missing from the history data according to the request (step B324). For example, the missing data manager 305 may determine whether or not a sequence number (sequence number 1311 of FIG. 13) of observation data stored as history data is continuous. If a sequence number is not continuous, it determines that there is data missing from the history data.

For example, in the history data stored in the history data storage manager 303, when observation data is arranged in order of time stamp and the next sequence number from the sequence number "0003" is "0008", observation data from the sequence number "0004" to "0007" is missing. The missing data manager 305, when there is data missing in the history data, holds the sequence numbers of the missing observation data (FIG. 14).

The missing data manager 305, when it is determined that there is data missing in the history data), issues a command which requests that the missing data be resent to the sensor network communicator 306 (step B325).

The sensor network communicator 306 issues the command received from the missing data manager 305, to the sensor node 150 (step B326). This command is received in the step B221 of FIG. 2A.

Next, the sensor network communicator 306 receives observation data (history data) transmitted from the sensor node 150 (step B327). The data received here is the data transmitted in the step B226 of FIG. 2A.

Next, the sensor network communicator 306 transmits the received observation data to the event distributor 304 (step B328). When plural observation data (for example, observation data from sequence number "0004" to "0007") is received in the step B327, this observation data is transmitted together in the step B328.

The event distributor 304 transmits the received observation data to the latest data storage manager 302 (step B329). The latest data storage manager 302, when the received observation data is newer than the observation data already stored in the latest data storage manager 302, stores the received observation data as the latest observation data. When the sensor network communicator transmits observation data together, the event distributor transmits the observation data together to the latest data storage manager, and the latest data storage manager, when there is data in the received observation data which is newer than the stored observation data, stores it as the latest observation data.

The event distributor 304 transmits the received observation data (i.e., the same data as what was transmitted in step B329) to the history data storage manager 303 (step B330). As a result, the received observation data is stored in the database managed by the history data storage manager 303 as history data. Due to this, data missing from the history data is compensated.

Next, the event distributor 304 transmits the received observation data (i.e., the same data as what was transmitted in the step B330) to the missing data manager 305 (step B331). The missing data manager 305 then deletes the same number as the sequence number 207 of the received observation data, from the sequence number 207 which it holds (FIG. 14).

The history data storage manager 303 transmits history data which was filled in by supplying missing data, to the external request receiver 301 (step B332).

The external request receiver 301 transmits the history data received from the history data storage manager 303 to the requesting source (step B333).

After the history data storage manager 303 receives a history data request from the external request receiver 301 (step B322), stored history data can also be transmitted immediately to the external request receiver 301. In this case, data with missing parts is transmitted to the requesting source from the external request receiver, but data with the missing parts filled in is transmitted to the requesting source in steps B323-B333. In this way, the requesting source can peruse history data quickly although there are missing parts, and it can also, without fail, peruse perfect history data without any missing parts. The history data storage manager 303, after receiving the history data request from the external request receiver 301 may also transmit the stored history data to the external request receiver 301 if compensation of history data is not performed within a predetermined time.

Steps B341-B344 of FIG. 3 show the processing performed by the sensor network management server 100 from which the latest observation data was requested by the user.

First, the external request receiver 301 receives a request for the latest observation data from a user (step B341).

Next, the external request receiver 301 transmits the received request to the latest data storage manager 302 (step B342).

According to the received request, the latest data storage manager 302 reads the latest observation data, and transmits it to the external request receiver 301 (step B343).

The external request receiver 301 transmits the observation data received from the latest data storage manager 302 to the requesting source (step B344).

Figure 4:
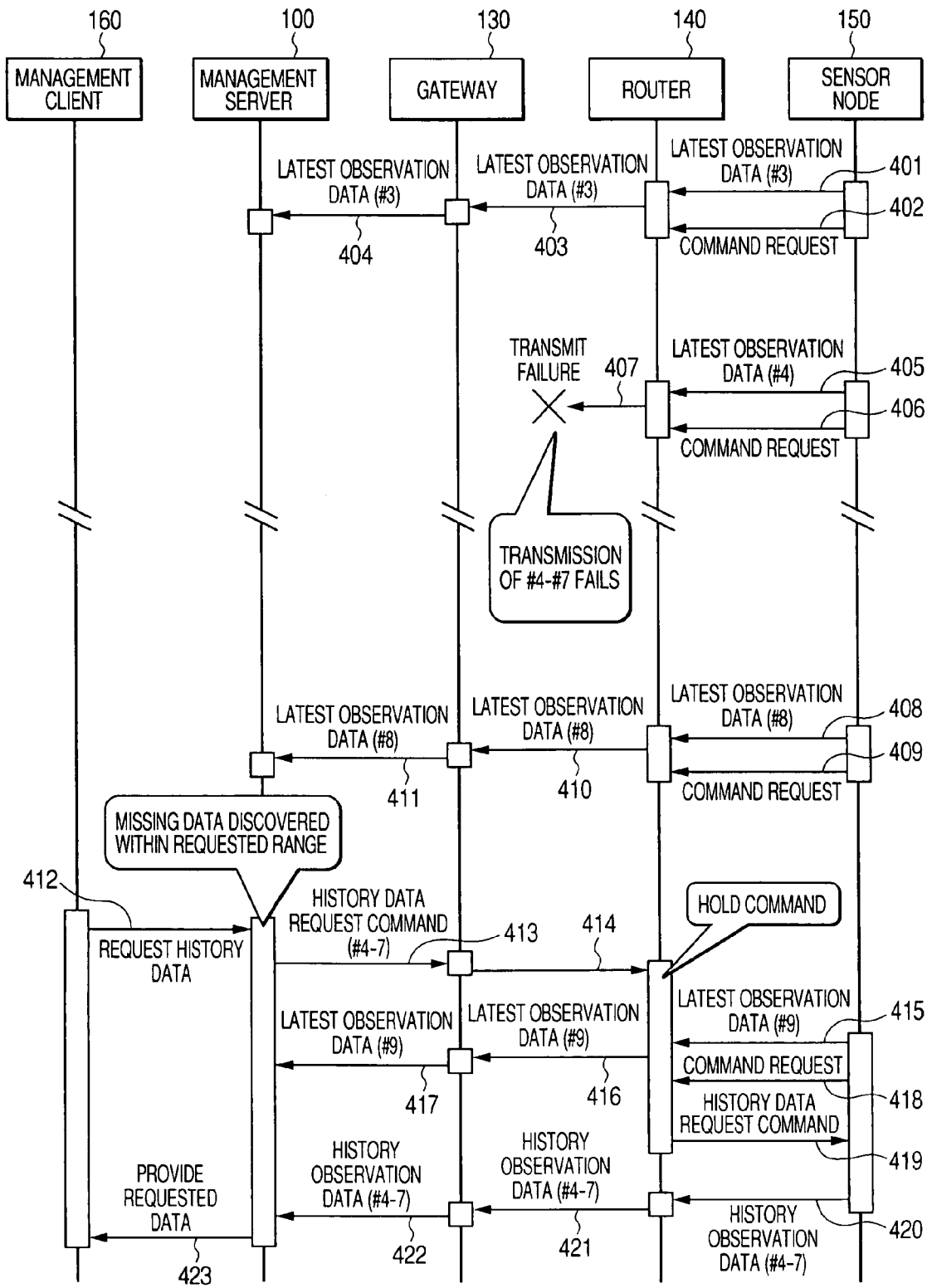
FIG. 4 is an example of a diagram of a command issue sequence of processing performed with a user request as a trigger according to an embodiment of the invention.

FIG. 4 is a diagram of a command issue sequence of processing performed with a user request as a trigger according to an embodiment of the invention.

The sensor node 150 observes environmental information autonomously, and transmits the latest observation data (step 401). If "#3" is displayed in the step 401, it means that the sequence number 207 of observation data transmitted in this example is "0003." The transmission of the step 401 corresponds to the step A215 of FIG. 2A.

The router node 140 receives the observation data transmitted in the step 401, and transmits the data (step 403). The gateway node 130 receives the observation data transmitted in the step 403, and transmits the data to the sensor network management server 100 via the IP network 180 (step 404). The sensor network management server 100 receives the observation data transmitted in the step 404. This reception corresponds to the step A311 of FIG. 3. The sensor network management server 100 which received the observation data performs the processing from the step A312 to A314 of FIG. 3.

The sensor node 150, when transmitting observation data in the step 401, also transmits a command request (step 402). Here, the command request will be described.

The sensor node 150 performs an intermittent operation autonomously, as described already. If the sensor node 150 is in the sleeping state, at least the wireless communicator 201 stops. Hence, the sensor node 150, while in the sleeping state cannot receive a command from the sensor network management server 100. The sensor network management server 100 cannot know whether or not the present sensor node 150 is in an activated state. Hence, when the sensor network management server 100 transmits a command to the sensor node 150, the command is held at the gateway node 130 or router node 140. The sensor node 150 then transmits a command request in the activated state.

If the gateway node 130 or router node 140 which received a command request is holding a command transmitted from the sensor network management server 100 to the sensor node 150, this command is transmitted to the sensor node 150.

In the example of FIG. 4, a command request transmitted in a step 402 is received by the router node 140. At this time, since the router node 140 is not holding a command, it does not transmit a command to the sensor node 150.

Subsequently, the sensor node 150 observes environmental information autonomously again, and transmits the latest observation data and a command request (steps 405 and 406). The sequence number 207 of observation data transmitted at this time is "0004." In the following description, the observation data whose sequence number 207 is "0003", is denoted by observation data #3", and the observation data whose sequence number 207 is "0004", is denoted by "observation data #4." This is identical for the other sequence numbers.

The router node 140 receives the observation data transmitted in the step 405, and transmits the data (step 407). However, in the example of FIG. 4, the transmission of the step 407 fails. As a result, the observation data transmitted in the step 405 does not reach the sensor network management server 100.

A conventional sensor node waits for an ACK of the application layer from the sensor network management server 100. When there is no ACK, the conventional sensor node determines that transmission has failed, and transmits the observation data again. However, the sensor node 150 of this embodiment goes into in a sleeping state without waiting for the ACK of the application layer from the sensor network management server 100. The sensor network management server 100 may transmit an ACK of the application layer, but the sensor node 150 of this embodiment enters the sleeping state whether or not it received the ACK.

Hence, the sensor node 150 of this embodiment does not consume waiting power waiting for the ACK and transmitting power for resending data. Communication control in the sensor node 150 is also simplified. Among the ACKs which the sensor node 150 which transmitted data can receive, there is the ACK of the application layer from the sensor network management server 100 and the ACK of the MAC layer from the router node 140 (or gateway node 130). It is assumed that the sensor node 150 of this embodiment, although it does not wait for ACK of the application layer, does wait for the ACK of the MAC layer. However, the invention can be applied also when the sensor node 150 is in the sleeping state without waiting for the ACK of the MAC layer.

The sensor node 150 then transmits observation data #5 to #7 in the same way (not shown). All these observation data, due to transmission failure, do not reach the sensor network management server 100. Therefore, in the history data storage manager 303 at this time, history data #4 to #7 is missing.

Subsequently, the sensor node 150 observes environmental information autonomously again, and transmits the latest observation data #8 and a command request (steps 408 and 409). The observation data #8 reaches the sensor network management server 100 via the router node 140 and gateway node 130 (steps 410 and 411).

Subsequently, the management client 160 requests history data in an arbitrary range from the sensor network management server 100 (step 412). This request corresponds to the step B321 of FIG. 3. FIG. 4 shows the case where the management client 160 requests history data, but the same processing is performed also when the operating client 165 requests history data. The same is true for FIGS. 6, 8 and 10, described later.

The sensor network management server 100 which received a request for history data performs the processing from the step B322 to B325 of FIG. 3. In the step B324, the missing data manager 305 determines whether or not there is any data missing from the history data over a range specified by the management client 160.

In the example of FIG. 4, the case is described where the management client 160 specifies the range containing observation data #4 to #7. Hence, the missing data manager 305 determines that there is data missing from the history data in the step B324. In this case, the sensor network management server 100 transmits a history data request command to the sensor node 150 (step 413). The step 413 corresponds to the step B326 of FIG. 3.

In the example of FIG. 4, transmission of observation data #4 to #7 fails. Hence, the command transmitted in the step 413 requests the sensor node 150 to transmit observation data #4 to #7. The command transmitted in the step 413 reaches the router node 140 via the gateway node 130, and is held by the router node 140 (step 414).

Subsequently, the sensor node 150 observes environmental information autonomously again, and transmits the latest observation data #9 and a command request (steps 415 and 418). The observation data #9 reaches the sensor network management server 100 via the router node 140 and gateway node 130 (steps 416 and 417). The step 417 corresponds to the step A311 of FIG. 3.

When the command request 418 is received, the router node 140 is holding the command to the sensor node 150. Hence, the router node 140 transmits the history data request command it is holding to the sensor node 150 (step 419).

The sensor node 150 receives the history data request command transmitted in the step 419. This reception corresponds to the step B221 of FIG. 2A. Subsequently, the sensor node 150, according to the received command, performs the processing from the step B222 to B225 of FIG. 2A. The sensor node 150 then transmits the history data requested by the command (step 420). The step 420 corresponds to the step B226 of FIG. 2A. The history data transmitted in the step 420 contains observation data #4 to #7.

Thus, when there is plural missing observation data in the history data, data is transmitted together with the plural missing data in one operation with the history data request from the user as a trigger. Hence, as compared with the prior art sensor node which transmits data again each time transmission fails, the sensor node 150 of this embodiment can reduce power for resending data.

The history data transmitted from the sensor node 150 reaches the sensor network management server 100 via the router node 140 and gateway node 130 (steps 421 and 422). This arrival corresponds to the step B327 of FIG. 3. Next, the sensor network management server 100 performs the processing from the step B332 to B328 of FIG. 3. The sensor network management server 100 then transmits the requested history data to the management client 160 (step 423). The step 423 corresponds to the step B333 of FIG. 3.

When the sensor network management server 100 is not able to receive observation data from the sensor node 150 for a long period of time, for example, a large amount of observation data will be missing. In such a case, if transmission of a large amount of observation data is requested, a processing delay may be caused which may not be desirable. In such a case, the observation data amount transmitted in one operation may also be restricted.

For example, the sensor network management server 100 may restrict the observation data specified by the history data request command in the step 413. For example, the sensor network management server 100 may request only observation data #4 and #5 in the step 413. In this case, after acquiring observation data #4 and #5, the sensor network management server 100 requests observation data #6 and #7. Alternatively, the observation data amount transmitted by the sensor node 150 may be restricted. At this time, among the requested observation data to be transmitted, the sensor node 150 may give priority to observation data corresponding to specific features, and may then transmit observation data not corresponding to those features, sequentially.

Here, the specific features may be observation data including observed values outside a predetermined range (or within a predetermined range). Alternatively, the features may be observation data including observed values for which a variation amount from the immediately preceding observed value exceeds a predetermined threshold. Alternatively, the features may be parameters for creating an approximation curve. Alternatively, among observation data which is continuously missing, it may be observation data having a predetermined gap (when observation data observed for example at intervals of 1 minute has 24 hours missing, the specific feature may be a 1 hour gap or 10 minute gap). Alternatively, the specific feature details may be observation data at the midpoint of continuously missing observation data.

When the specific feature is the aforesaid observation data having a predetermined gap or observation data at a midpoint, instead of the sensor node 150, the sensor network management server 100 may determine the feature.

When the sensor node 150 overwrites old observation data with new observation data, old observation data other than that with the specific feature may be overwritten with higher priority.

This sensor network management server may of course perform processing which restricts the observation data specified by a history data request command or processing which restricts the observation data amount transmitted by the sensor node, when the history data request command is transmitted regularly or at a predetermined time described later (FIGS. 5 and 6), when the history data request command is transmitted based on the result of the heartbeat monitor (FIGS. 7 and 8), or when the history data request command is transmitted based on a sequence number (FIGS. 9 and 10).

This terminates the processing command issue sequence executed with a user request as a trigger (step 412).

According to the aforesaid processing shown in FIGS. 3 and 4, unless history data is deleted from the sensor node 150, perfect history data which definitely does not have any data missing is returned in response to a user request. Further, since missing data is compensated with a history data request from the user as a trigger, completed data can be provided when the user requests it as far as possible.

FIG. 5 is a schematic view of the sensor network management server 100 and the data flow when history data is acquired with a time entry as a trigger according to an embodiment of the invention.

Specifically, FIG. 5 shows functional blocks and the data flow for acquiring history data periodically or at a predetermined time. In FIG. 5, the same parts and processing as those of FIG. 3 are not described in detail. The same applies to FIGS. 7 and 9, described later.

The sensor network management server 100 comprises the external request receiver 301, latest data storage manager 302, history data storage manager 303, event distributor 304, missing data manager 305, and sensor network communicator 306. These units were already described referring to FIG. 3, so their detailed description is omitted.

The sensor network management server 100 of FIG. 5 further comprises a timer 501 which manages time entries.

Steps A511 to A514 of FIG. 5 are respectively identical to the steps A311 to A314, so their description is omitted.

Steps B521 to B529 of FIG. 5 show processing performed by the sensor network management server 100. Specifically, these steps show processing performed by the sensor network management server 100 periodically or at a predetermined time according to a request from the timer 501.

First, the timer 501 transmits a request which examines whether there is any data missing from the history data, to the missing data manager 305 (step B521). The timer 501 may transmit the request of the step B521 at a predetermined interval (i.e., periodically). Alternatively, the timer 501 may transmit the request of step B521 at a predetermined time.

The missing data manager 305 examines whether or not there is any data missing from the history data according to the received request (step B522).

The missing data manager 305, when it determines that there is data missing from the history data, issues a command to the sensor network communicator 306 which requests that the missing data should be retransmitted (step B523).

The sensor network communicator 306 issues the command received from the missing data manager 305 to the sensor node 150 (step B524). This command is received in the step B221 of FIG. 2A.

Next, the sensor network communicator 306 receives observation data (history data) transmitted from the sensor node 150 (step B525). The data received here is the data transmitted in the step B226 of FIG. 2A.

Next, the sensor network communicator 306 transmits the received observation data to the event distributor 304 (step B526).

The event distributor 304 transmits the received observation data to the latest data storage manager 302 (step B527). The latest data storage manager 302, when the received observation data is newer than the observation data already stored in the latest data storage manager 302, stores the received observation data as the latest observation data.

The event distributor 304 transmits the received observation data (i.e., the same data as what was transmitted in the step B527) to the history data storage manager 303 (step B528). As a result, the received observation data is stored in a database managed by the history data storage manager 303 as history data. The data missing from the history data is thereby compensated.

Next, the event distributor 304 transmits the received observation data (i.e., the same data as what was transmitted in the step B528) to the missing data manager 305 (step B529).

The steps B522 to B529 are respectively identical to the steps B324 to B331 of FIG. 3.

In FIG. 5, when the external request receiver 301 receives a request for history data (step B530), the request is transmitted to the history data storage manager 303 (step B531).

The history data storage manager 303 which received the request from the external request receiver 301, transmits the history data stored in the database at that time to the external request receiver 301 (step B532).

The external request receiver 301 transmits the history data received from the history data storage manager 303 to the requesting source (step B533).

The processing of the steps B530 to B533 is performed regardless of the processing from the steps B521 to B529. Hence, when the step B531 is performed, there may be data missing from the history data stored in the database. In this case, the history data storage manager 303 transmits the history data from which data is missing, in the step 532.

Since the processing performed by the sensor network management server 100 from which the latest observation data was requested, is identical to that from the steps 341 to step 344 of FIG. 3, its description will be omitted. This is also the same for FIGS. 7 and 9 described later.

FIG. 6 is a diagram of a command issue sequence of the processing performed with a time entry as a trigger according to an embodiment of the invention.

In FIG. 6, steps 601 to 607 are respectively identical to the steps 401 to 407 of FIG. 4, so a description of these steps will be omitted. The data transmitted in the step 604 is received in the step A511 of FIG. 5.

In the example of FIG. 6, transmission of observation data #4 to #7 fails as in FIG. 4. Since observation data #4 to #7 does not reach the sensor network management server 100, it has not yet been stored in the history data storage manager 303. In other words, in the history data storage manager 303 at this time, history data #4 to #7 is missing.

Next, the management client 160 requests history data in an arbitrary range from the sensor network management server 100 (step 608). This request corresponds to the step B530 of FIG. 5. This request specifies a range including observation data #4 to #7 as in the example of FIG. 4.

In the sensor network management server 100, the processing of the steps B531 and B532 of FIG. 5 is performed. The sensor network management server 100 then transmits the requested history data to the management client 160 (step 609). The step 609 corresponds to the step B533 of FIG. 5. However, in the history data transmitted here, observation data #4 to #7 is missing.

Steps 610 to 613 are respectively identical to the steps 408 to 411 of FIG. 4, so a description of these steps will be omitted. The data transmitted in the step 613 is received in the step A511 of FIG. 5.

The timer 501 then transmits a request which examines whether there is any data missing from the history data, to the missing data manager 305 (step 614). The step 614 corresponds to the step B521 of FIG. 5. In the step B522, the missing data manager 305 determines that there is data missing from the history data, and performs the step B523.

Next, the sensor network management server 100 transmits a history data request command requesting that observation data #4 to #7 be transmitted, to the sensor node 150 (step 615). The step 615 corresponds to the step B524 of FIG. 5. The command transmitted in the step 615 reaches the router node 140 via the gateway node 130 (step 616), and is held by the router node 140.

Next, steps 617 to 624 are respectively identical to the steps 415 to 422 of FIG. 4, so a description of these steps will be omitted. The data transmitted in the step 619 is received in the step A511 of FIG. 5. The data transmitted in the step 624 is received in the step B525 of FIG. 5.

Next, the management client 160 again requests the sensor network management server 100 for history data in an arbitrary range (step 625). This request corresponds to the step B530 of FIG. 5. This request specifies a range comprising observation data #4 to #7 as in the step 608.

In the sensor network management server 100, the processing of the steps B531 and B532 of FIG. 5 is performed. The sensor network management server 100 then transmits the requested history data to the management client 160 (step 626). Observation data #4 to #7 which was missing has already been compensated at this time (step 624). Hence, in the step 626, complete history data including observation data #4 to #7 is transmitted.

According to the processing shown in the above FIGS. 5 and 6, since after the user requests history data (steps 608 and 625), history data is immediately returned from the management server) (steps 609 and 626), the user can peruse the history data quickly.

Figure 7:
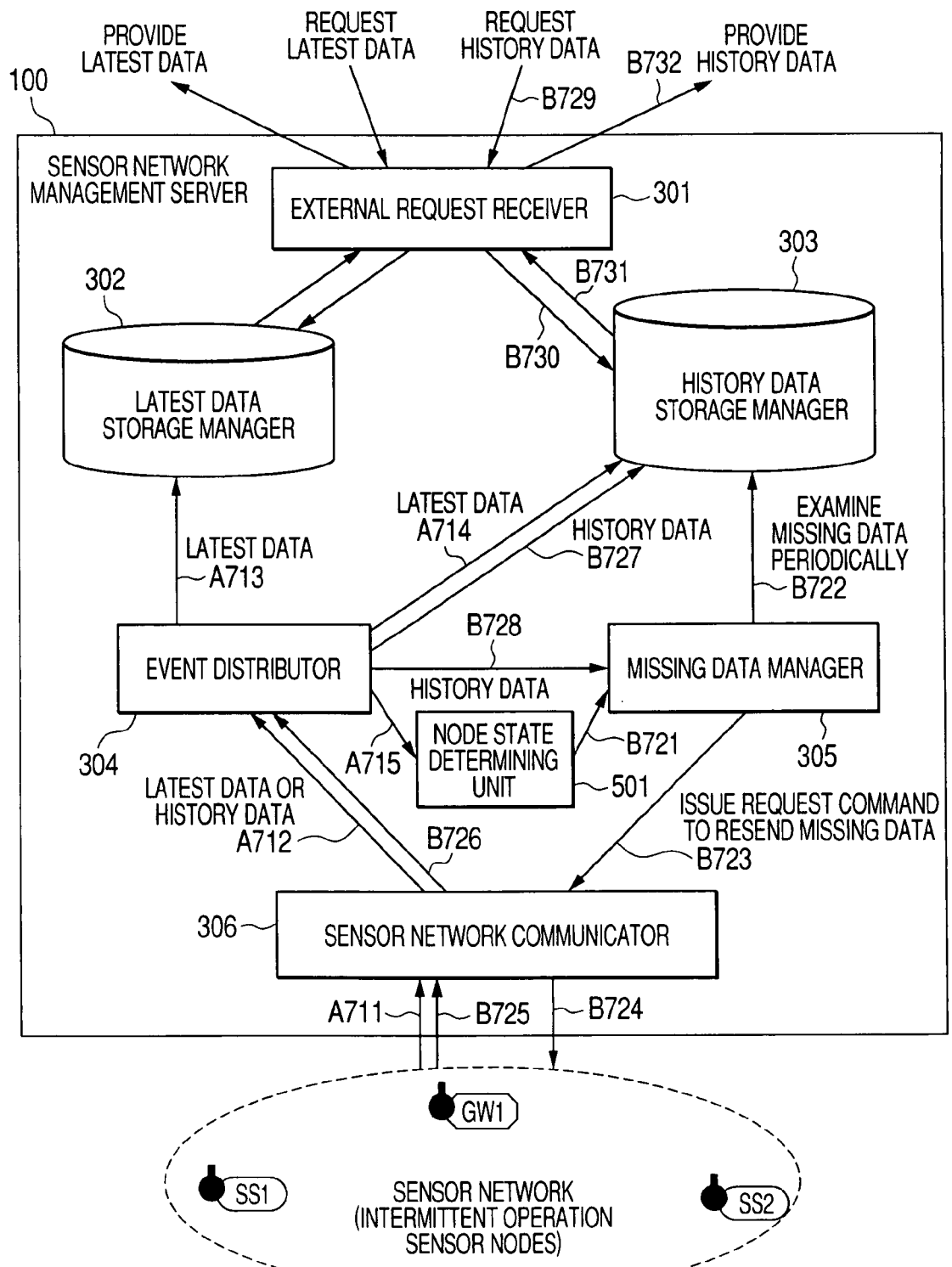
FIG. 7 is an example of a schematic view of a sensor network management server and a diagram of data flow when history data is acquired with a heartbeat restoration as a trigger according to an embodiment of the invention.

FIG. 7 is a schematic view of the sensor network management server 100 and the data flow when history data is acquired with heartbeat restoration as a trigger according to an embodiment of the invention.

Specifically, FIG. 7 shows a schematic view and data flow for acquiring history data when, after the heartbeat temporarily disappears, it is restored.

Here, a heartbeat determination will be described.

A heartbeat determination is one way to monitor abnormalities of a device which is operating remotely. The device to be monitored transmits a specific heartbeat signal at a predetermined interval. A monitor (device on the side which monitors the device to be monitored) determines the operating state of the device to be monitored based on the receiving state of the heartbeat signal.

For example, if a monitor knows the transmitting interval of the heartbeat signal, it can compute the time at which the heartbeat signal should be received based on the time at which the heartbeat signal was received last and the transmitting interval of the heartbeat signal. If the computed time is before the present time, the next heartbeat signal which should already have been received, will still not have been received.

Hence, when a heartbeat signal disappears (i.e., when the heartbeat signal is no longer received within the aforesaid predetermined interval), it is determined that a fault has occurred in the device to be monitored. On the other hand, if the present time is prior to the computed time, it is determined that the device to be monitored is normal.

When performing a heartbeat determination in this embodiment, the device to be monitored is the sensor node 150. Hence, the sensor node 150 transmits a heartbeat signal. However, it is not desirable to transmit a heartbeat signal as well as observation data since power consumption increases. When observation data is transmitted periodically, the observation data itself can be used as a heartbeat signal. Hereafter, as an example, the case will be described where observation data is used as a heartbeat signal.

The sensor network management server 100 comprises the external request receiver 301, latest data storage manager 302, history data storage manager 303, event distributor 304, missing data manager 305, and sensor network communicator 306. Since these units have already been described referring to FIG. 3, their description will be omitted.

The sensor network management server 100 of FIG. 7 further comprises a node state determining unit 701. The node state determining unit 701 monitors a heartbeat signal periodically transmitted from the sensor node 150. When the heartbeat signal disappears (i.e., when it stops receiving a heartbeat signal within the predetermined interval), the node state determining unit 701 determines that a fault has occurred in the sensor node 150 itself, or it determines that a fault has occurred in the communication path from the sensor node 150 to the sensor network management server 100. In the example of FIG. 7, the node state determining unit 701 uses the observation data periodically transmitted from the sensor node 150 as a heartbeat signal.

Steps A711 to A714 of FIG. 7 are respectively the same as the steps A311 to A314 of FIG. 3, so their description will be omitted.

The event distributor 304 of FIG. 7 transmits the latest observation data received from the sensor network communicator 306 to the node state determining unit 701 as a heartbeat signal (step A715).

Steps B721 to B728 of FIG. 7 show the processing performed by the sensor network management server 100 with heartbeat restoration as a trigger. Specifically, these steps show the processing performed by the sensor network management server 100 when, following a request from the node state determining unit 701, communication from the sensor node 150 to the sensor network management server 100 is restored.

While observation data transmitted periodically from the sensor node 150 reaches the sensor network management server 100 normally, the state determining unit 701 receives a heartbeat signal periodically from the event distributor 304. When observation data stops reaching the sensor network management server 100, the sensor network management server 100 stops receiving the heartbeat signal periodically. Hence, when the heartbeat signal disappears, the node state determining unit 701 determines that a fault has occurred in the sensor node 150 or the communication path.

Subsequently, if a heartbeat signal is received again, the node state determining unit 701 determines that the sensor node 150 or communication path has recovered from the fault. At this time, the node state determining unit 701 transmits a request which examines whether or not there is any data missing from the history data, to the missing data manager 305 (step B721).

The missing data manager 305 examines whether or not there is any data missing from the history data according to the received request (step B722).

The missing data manager 305, if it determines that data is missing from the history data, issues a history data request command to the sensor network communicator 306 requesting that missing history data should be resent (step B723).

The sensor network communicator 306 issues the command received from the missing data manager 305 to the sensor node 150 (step B724). This command is received in the step B221 of FIG. 2A.

Next, the sensor network communicator 306 receives observation data (history data) transmitted from the sensor node 150 (step B725). The data received here is the data transmitted in the step B226 of FIG. 2A.

Next, the sensor network communicator 306 transmits the received observation data to the event distributor 304 (step B726).

The event distributor 304 transmits the received observation data to the history data storage manager 303 (step B727). As a result, the received observation data is stored in a database managed by the history data storage manager 303. Due to this, missing history data is compensated.

Next, the event distributor 304 transmits the received observation data (i.e., the same data as what was transmitted in the step B727) to the missing data manager 305 (step B728).

The steps B722 to B726 are respectively the same as the steps B324 to B328 of FIG. 3. The steps B727 to B728 are respectively the same as the steps B330 to B331 of FIG. 3.

In FIG. 7, when the external request receiver 301 receives a request for history data (step B729), the request is transmitted to the history data storage manager 303 (step B730).

The history data storage manager 303 which received the request from the external request receiver 301 then transmits history data stored in a database to the external request receiver 301 (step B731). Missing history data may also be transmitted in the step B731 for the same reason as in the step B532 of FIG. 5.

The external request receiver 301 transmits the history data received from the history data storage manager 303 to the requesting source (step B732).

Figure 8:
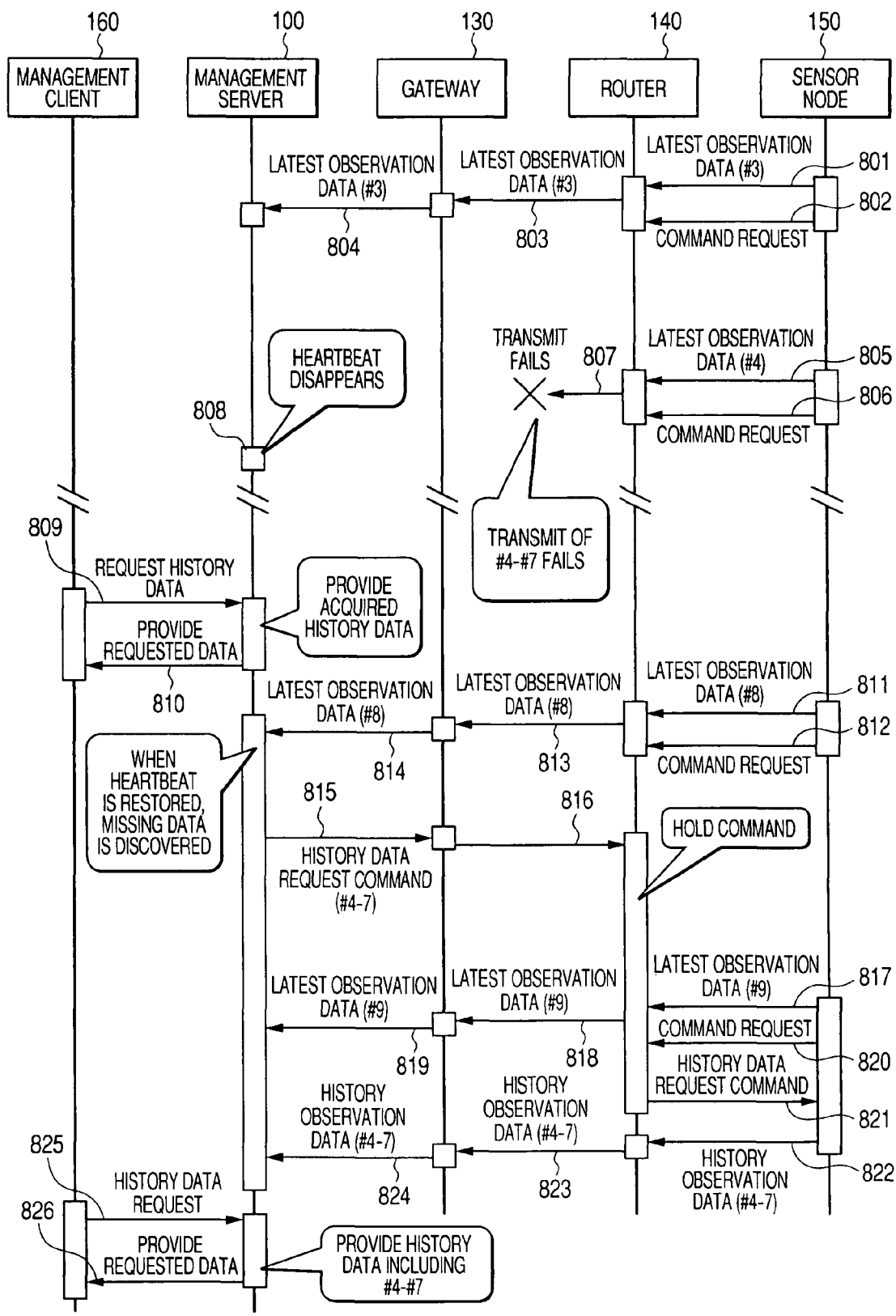
FIG. 8 is an example of a diagram of a command issue sequence of processing performed with heartbeat restoration as a trigger according to an embodiment of the invention.

FIG. 8 is a diagram of a command issue sequence of the processing performed with heartbeat restoration as a trigger, according to one embodiment of the invention.

In FIG. 8, steps 801 to 807 are respectively identical to the steps 401 to 407 of FIG. 4, so a description of these steps is omitted. The data transmitted in the step 804 is received in the step A711 of FIG. 7.

In the example of FIG. 8, transmission of observation data #4 to #7 fails as in FIG. 4. Hence, in the history data storage manager 303 at this time, history data #4 to #7 is missing.

The node state determining unit 701, when it does not receive observation data #4, detects disappearance of the heartbeat signal (step 808).

Next, the management client 160 requests history data from the sensor network management server 100 in an arbitrary range (step 809). This request corresponds to the step B729 of FIG. 7. This request specifies a range including observation data #4 to #7 as in the example of FIG. 4.

In the sensor network management server 100, the processing of the steps B730 and B731 of FIG. 7 is performed, and the sensor network management server 100 transmits the requested history data to the management client 160 (step 810). The step 810 corresponds to the step B732 of FIG. 7. However, in the history data transmitted here, observation data #4 to #7 is missing.

Next, the sensor node 150 observes environmental information autonomously again, and transmits the latest observation data #8 and a command request (steps 811 and 812). The observation data #8 reaches the sensor network management server 100 via the router node 140 and gateway node 130 (steps 813 and 814). Observation data #8 transmitted in the step 814 is received by the sensor network communicator 306 in the step A711 of FIG. 7.

Observation data #8 received by the sensor network communicator 306 is transmitted to the node state determining unit 701 as a heartbeat signal via the event distributor 304 (step A715).

When the node state determining unit 701 receives observation data #8, it determines that the heartbeat is restored, i.e., it determines that the sensor node 150 or communication path has recovered from a fault. In this case, the node state determining unit 701 transmits a request which examines whether there is any data missing from the history data, to the missing data manager 305 (step B721 of FIG. 7). In the step B722, the missing data manager 305 determines that data is missing from the history data, and performs the step B723.

Next, a history data request command which requests that the sensor network management server 100 transmit observation data #4 to #7, is transmitted to the sensor node 150 (step 815). The step 815 corresponds to the step B724 of FIG. 7. The command transmitted in the step 815 reaches the router node 140 via the gateway node 130 (step 816), and is held by the router node 140.

Steps 817 to 824 are respectively the same as the steps 415 to 422, so a description of these steps is omitted. The data transmitted in the step 819 is received in the step A711 of FIG. 7. The data transmitted in the step 824 is received in the step B725 of FIG. 7.

The management client 160 then again requests the sensor network management server 100 for history data in an arbitrary range (step 825). This request corresponds to the step B729 of FIG. 7. This request specifies a range containing observation data #4 to #7 as in the step 809. At this time, the same processing as that of the steps 809 and 810 is performed, and history data is transmitted (step 826). However, observation data #4 to #7 which was missing is already compensated at this time (step 824). Hence, in the step 826, perfect history data containing observation data #4 to #7 is transmitted.

The above FIGS. 7 and 8 illustrate a case where observation data is used as the heartbeat signal. When the sensor node 150 observes environmental information (for example, temperature or humidity etc.) periodically, observation data can be used as the heartbeat signal. In this case, disappearance of the heartbeat signal means that observation data does not arrive, i.e., history data is missing. Therefore, in this case, it is necessary to perform processing (step B721 to B728 of FIG. 7) which compensates the missing history data.

However, while the heartbeat has disappeared, the possibility that a signal will reach the sensor network management server 100 from the sensor node 150 at is low. When the heartbeat is restored, the possibility that the signal will arrive is high. Hence, while the heartbeat has disappeared, it is not transmitted, but a history data request command is transmitted after the heartbeat is restored (step 815). Since the history request command for compensating missing data is issued when the possibility that missing data can be compensated is high, the management server can compensate missing data efficiently and processing of the management server is reduced.

On the other hand, unlike the aforesaid example, there is also a case where observation data is not transmitted periodically. For example, when the environmental information to be observed is an event (for example, the opening and closing of a door) generated irregularly, the sensor node 150 transmits observation data when the event is detected. Hence, the sensor node 150 which does not transmit observation data periodically needs to transmit a heartbeat signal periodically independently of observation data. In this case, even if the heartbeat signal disappears, missing data does not necessarily occur in the history data. For example, if the heartbeat signal disappears, and a door is not opened and closed once by the time it is restored, the history data does not suffer a loss.

In such a case, it can be determined whether the history data suffered a loss by assigning a sequence number shared with observation data to the heartbeat signal. For example, the sensor node 150 may assign the same sequence number as the sequence number 207 assigned to the observation data which is finally transmitted, to the heartbeat signal, and transmit it. In this case, if an observation data having the same or an older sequence number than the sequence number of the heartbeat signal which was restored and received first, has not yet been received, it is determined that data is missing from the history data.

Since according to the processing shown in the above FIGS. 7 and 8, history data is returned (steps 809 and 825) shortly after a user requests a history (steps 810 and 826), the user can peruse the history data quickly.

FIG. 9 is a schematic view of the sensor network management server 100 and data flow when history data is acquired with a sequence number as a trigger according to an embodiment of the invention.

As described already, the sensor node 150 stores history data in the data storage unit 206. However, since the data capacity of the data storage unit 206 is limited, when there is no available capacity and new observation data is stored, the oldest history data is deleted. Therefore, the sensor network management server 100, when there is data missing from the history data stored in the history data storage manager 303, must issue a history data request command before the missing history data is deleted from the data storage unit 206.

The sensor network management server 100 shown in FIG. 9, in order to acquire history data before history data is deleted from the data storage unit 206, determines a timing which issues a history data request command based on a sequence number.

The sensor network management server 100 comprises the external request receiver 301, latest data storage manager 302, history data storage manager 303, event distributor 304, missing data manager 305, and sensor network communicator 306. Since they have already been described referring to FIG. 3, a description of each of these units is omitted.

Steps A911 to A914 of FIG. 9 are respectively the same as the steps A311 to A314, so their description is omitted.

The event distributor 304 of FIG. 9 also transmits the latest observation data received from the sensor network communicator 306 to the missing data manager 305 (step A915).

Steps B921 to B927 of FIG. 9 show the processing performed by the sensor network management server 100 with a sequence number as a trigger. Specifically, these steps show the processing performed by the sensor network management server 100 based on the result of comparing the sequence number of history data which is missing, and the sequence number of the latest observation data received from the event distributor 304.

The step B921 corresponds to the step A915. The missing data manager 305, in the step B921, receives the latest observation data from the event distributor 304.

The missing data manager 305 compares the sequence number of the latest observation data which was received with the sequence number of missing history data. Specifically, the missing data manager 305 determines whether any data is missing from the history data stored in the history data storage manager 303. When there is missing data, the missing data manager 305 determines whether or not the difference of the sequence number of the oldest history data among the missing history data, and the sequence number of the latest observation data received, exceeded a predetermined threshold. The predetermined threshold is defined based on a ratio relative to the data capacity of the data storage unit 206.

For example, in the example of FIG. 2B, the data storage unit 206 can accumulate 65536 (65535 when converted into a decimal number) observation data from "0000" for which the sequence number is 207, to "FFFF". For example, if the threshold is set based on a ratio of "50%" to data capacity, the threshold is then is 50% of 65536 which is 32768.

In this case, the missing data manager 305, when the difference of the sequence number of the oldest missing history data and the sequence number of the latest observation data received exceeds 32768, determines whether it is necessary to issue a history data request command. The missing data manager 305 then issues the history data request command to the sensor network communicator 306 requesting resend of the missing history data (step B922). As a result, it can be expected that the missing history data will be acquired before it is deleted.

The sensor network communicator 306 issues the command received from the missing data manager 305, to the sensor node 150 (step B923). This command is received in the step B221 of FIG. 2A.

Next, the sensor network communicator 306 receives observation data (history data) transmitted from the sensor node 150 (step B924). The data received here is the data transmitted in the step B226 of FIG. 2A.

Next, the sensor network communicator 306 transmits the received observation data to the event distributor 304 (step B925).

The event distributor 304 transmits the received observation data to the history data storage manager 303 (step B926). As a result, the received observation data is stored in a database managed by the history data storage manager 303 as history data. Due to this, the missing history data is compensated.

Next, the event distributor 304 transmits the received observation data (i.e., the same data as what was transmitted in step B926) to the missing data manager 305 (step B927).

The steps B922 to B925 are respectively the same as the steps B325 to B328 of FIG. 3.

The steps B926 to B927 are respectively the same as the steps B330 to B331 of FIG. 3.

In FIG. 9, when the external request receiver 301 receives the request for history data (step B928), the request is transmitted to the history data storage manager 303 (step B929).

The history data storage manager 303 which received the request from the external request receiver 301 transmits history data stored in the database at that time to the external request receiver 301 (step B930). Due to the same reason as for the step B532 of FIG. 5, in the step B930, history data from which data is missing may be transmitted.

The external request receiver 301 transmits the history data received from the history data storage manager 303 to the requesting source (step B931).

FIG. 10 is a diagram of a command issue sequence of the processing performed with a sequence number as a trigger, according to one embodiment of the invention.

Steps 1001 to 1007 of FIG. 10 are respectively the same as the steps 401 to 407 of FIG. 4, so a description of these steps is omitted. The data transmitted in the step 1004 is received in the step A911 of FIG. 9.

In the example of FIG. 10, transmission of observation data #4 to #7 fails as in FIG. 4. Hence, in the history data storage manager 303 at this time, history data #4 to #7 is missing.

Hence, the management client 160 requests the sensor network management server 100 for history data in an arbitrary range (step 1008). This request corresponds to the step B928 of FIG. 9. This request specifies a range containing observation data #4 to #7 as in the example of FIG. 4.

In the sensor network management server 100, the processing of the steps B929 and B930 of FIG. 9 is performed. The sensor network management server 100 then transmits the requested history data to the management client 160 (step 1009). The step 1009 corresponds to the step B931 of FIG. 9. However, in the history data transmitted here, observation data #4 to #7 is missing.

The sensor node 150 then again observes environmental information autonomously, and transmits the latest observation data #8 and a command request (steps 1010 and 1011). Observation data #8 reaches the sensor network management server 100 via the router node 140 and gateway node 130 (steps 1012 and 1013). Observation data #8 transmitted in the step 1013 is received by the sensor network communicator 306 in the step A911 of FIG. 9.

Observation data #8 received by the sensor network communicator 306 is transmitted to the missing data manager 305 via the event distributor 304 (step A915).

The missing data manager 305 determines whether or not a difference "4" between the sequence number "0008" of the observation data #8 which was received, and the oldest sequence number "0004" of history data #4 which was missing, exceeds a predetermined threshold. If the predetermined threshold is "3", it is determined that the difference of the two sequence numbers exceeds the threshold, and the steps B922 and B923 are performed. As a result, the sensor network management server 100 transmits a history data request command requesting that observation data #4 to #7 be transmitted to the sensor node 150 (step 1014). The step 1014 corresponds to the step B923 of FIG. 9.

The command transmitted in the step 1014 reaches the router node 140 via the gateway node 130 (step 1015), and is held by the router node 140.

Steps 1016 to 1023 performed thereafter are respectively identical to the steps 415 to 422 of FIG. 4, so a description of these steps is omitted. The data transmitted in the step 1018 is received in the step A911 of FIG. 9. The data transmitted in the step 1023 is received in the step B924 of FIG. 9.

Next, the management client 160 again requests the sensor network management server 100 for history data in an arbitrary range (step 1024). This request corresponds to the step B928 of FIG. 9. This request specifies a range containing observation data #4 to #7 as in the step 1008. At this time, the same processing as that of the steps 1008 and 1009 is performed, and history data is transmitted (step 1025). However, observation data #4 to #7 which was missing is already compensated at this time (step 1023). Hence, in the step 1025, perfect history data including observation data #4 to #7 is transmitted.

According to the processing shown in the above FIGS. 9 and 10, if a user requests a history (steps 1008 and 1024), history data is returned immediately (steps 1009 and 1025), so the user can peruse the history data quickly. Further, considering the data capacity of the data storage unit 206 in the sensor node 150, since the missing data can be compensated before the oldest history data stored on the sensor node is deleted, the missing history data can be provided to the user without any loss.

Figure 11:
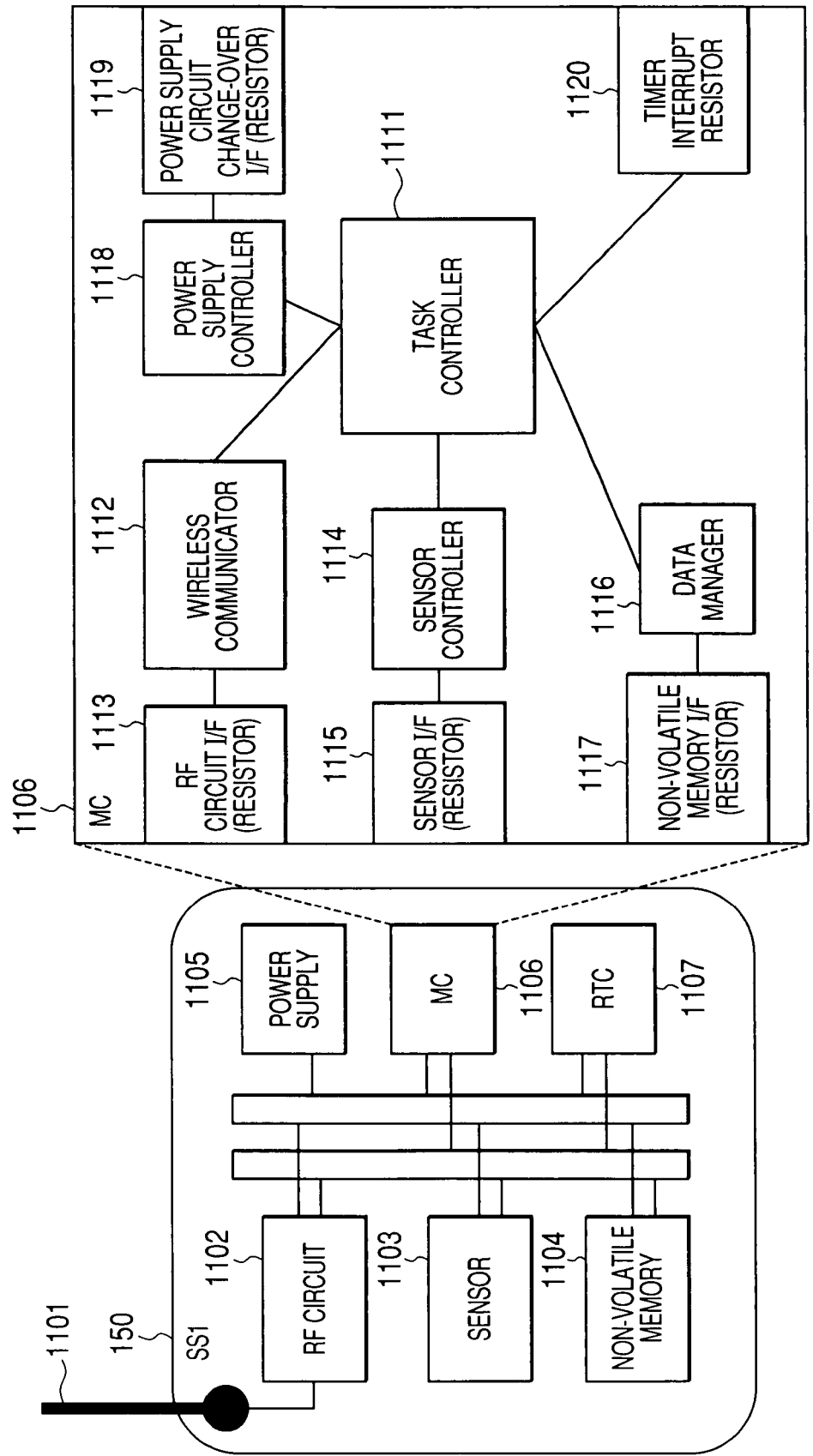
FIG. 11 is an example of a block diagram showing the construction of a sensor node according to an embodiment of the invention.

FIG. 11 is a block diagram showing the construction of the sensor node 150 according to an embodiment of the invention.

The sensor node 150 of this embodiment is provided with an antenna 1101, RF circuit 1102, sensor 1103, nonvolatile memory 1104, power 1105, microcomputer (MC) 1106, and real-time clock (RTC) 1107.

The RF circuit 1102 is a high frequency (RF) circuit which communicates via the router node 140 or gateway node 130 and a wireless channel via the antenna 1101.

The sensor 1103 observes environmental information. The sensor 1103 of this embodiment observes at least temperature and humidity. The sensor 1103 may be any other kind of sensor (for example, an acceleration sensor etc.).

The nonvolatile memory 1104 is for example an EEPROM. The nonvolatile memory 1104 of this embodiment corresponds to the data storage unit 206 shown in FIG. 2A. Specifically, at least the observation data shown in FIG. 2B is stored in the nonvolatile memory 1104. Other data may also be stored in the nonvolatile memory 1104. Since the data shown in FIG. 2B is stored in the nonvolatile memory 1104, even if power to the sensor node is interrupted (for example, even if power supply stops completely due to battery replacement), the data does not disappear.

The power supply 1105 supplies power for driving each unit of the sensor node 150.

The power supply 1105 of this embodiment is for example a battery, but it may be another type of power supply.

The RTC 1107 manages time entries. The RTC 1107 may be a timer which measures a predetermined time and, specifically, may be a clock which measures the present time. The RTC 1107 of this embodiment is a clock which measures the present time. The RTC 1107 corresponds to the timer 205 shown in FIG. 2A.

If the power supply stops completely for battery replacement or the like, the sensor node 150 is reset. As a result, the RTC 1107 no longer holds the exact time. Here, the exact time is a time synchronized with the time managed by the sensor network management server 100. On the other hand, the data stored in the nonvolatile memory 1104 does not disappear. After power is restored, when the sensor node 150 starts observation of environmental information, observation data is then stored in the data storage unit 206 (i.e., the nonvolatile memory 1104). At this time, the sequence number 207 of observation data stored first is the next value after the value stored immediately prior to when the sensor node 150 was reset.

After the sensor node 150 is reset until time synchronization processing is performed, a non-exact time entry (i.e., a time not synchronized with the time managed by the sensor network management server 100), is stored in the time stamp 208. Observation data stored before time synchronization processing was performed is not transmitted even if transmission is requested by a history data request command. The time synchronization processing performed thereafter will be described referring to FIGS. 21A and 21B.

A MC 1106 controls the sensor node 150 overall. The MC 1106 may have a CPU (not shown), RAM (not shown), and ROM (not shown). In this case, various functions are implemented when the CPU executes the software stored in the ROM. FIG. 11 also shows a block diagram of the functions implemented by the MC 1106.

The MC 1106 comprises a task controller 1111, wireless communicator 1112, RF circuit interface (I/F) 1113, sensor controller 1114, sensor I/F 1115, data manager 1116, nonvolatile memory I/F 1117, control power supply 1118, power supply circuit change-over I/F 1119, and timer interruption register 1120.

The task controller 1111 controls the wireless communicator 1112, sensor controller 1114, data manager 1116, and power supply controller 1118.

The wireless communicator 1112 controls the wireless communications performed by the RF circuit 1102. The wireless communicator 201 shown in FIG. 2A corresponds to the wireless communicator 1112. The RF circuit I/F 1113 is a register used for the wireless communicator 1112 to control the RF circuit 1102.

The sensor controller 1114 controls observation of environmental information performed by the sensor 1103. The sensor controller 1114 corresponds to the sensor controller 202 shown in FIG. 2A. When the sensor 1103 is a digital sensor, the sensor I/F 1115 is a register for the sensor controller 1114 to control the sensor 1103. When the sensor 1103 is an analog sensor, the sensor I/F 1115 corresponds to an A/D (analog to digital) converter.

The data manager 1116 controls data write and read to and from the nonvolatile memory 1104. The nonvolatile memory 1117 is a register used for the data manager 1116 to perform data write and read to and from the nonvolatile memory.

The control power supply 1118 controls input and interruption of power to each unit by the power supply 1105. The power supply circuit change I/F is a register used for the control power supply 1118 to control the power supply 1105.

The timer interrupt register 1120 starts the task controller 1111 in response to an interrupt from the RTC 1107.

The units shown in FIG. 11 together realize the functions of the sensor node 150 shown in FIG. 2A and FIG. 4.

For example, in the step A211 of FIG. 2A, the task controller 1111, when an interrupt is received from the RTC 1107 via the timer 1120, requests power input to each unit of the sensor node 150 from the power supply controller 1118. As a result, the sensor node 150 enters the activated state. The task controller 1111 requests the sensor controller 1114 to perform observation of environmental information. The sensor controller 1114 controls the sensor 1103 via the sensor I/F 1115, and observes environmental information.

In the steps A212 to A214, the task controller 1111 receives the environmental information observed by the sensor controller 1114, requests the wireless communicator 1112 to transmit environmental data containing this environmental information, and requests the data manager 1116 to store the environmental data.

Also, in the steps B222 to B223 of FIG. 2A, the task controller 1111, following a request received by the wireless communicator 1112, requests the data manager 1116 to read history data from the nonvolatile memory 1104. In the steps B224 to B225 of FIG. 2A, the task controller 1111 requests the wireless communicator 1112 to transmit the history data read by the data manager 1116.

When the above series of steps are completed, the task controller 1111 requests the power supply controller 1118 to interrupt power supply to all units other than the RTC 1107. As a result, the sensor node 150 enters the sleeping state.

On the other hand, the sensor node 150 may also perform intermittent operation irregularly. For example, when the sensor node 150 is provided with the sensor 1103 which observes the opening and closing of a door, and the sensor 1103 observes the opening and closing of the door, the sensor node 150 is in the activated state. When observation data is transmitted, the sensor node 150 is in the sleeping state. In this case, in the sensor node 150 which is in the sleeping state, at least the sensor 1103 needs to be operating.

In any case, when the sensor node 150 is in the sleeping state, the power supply to at least the RF circuit is interrupted. Hence, the power consumption of the sensor node 150 in the sleeping state is small as compared with when it is in the activated state.

FIG. 12 is a flowchart of history data request command response processing performed by the sensor node 150 according to an embodiment of the invention.

Specifically, FIG. 12 shows the processing performed when the sensor node receives a history data request command (step 413, etc. of FIG. 4). This processing corresponds to the processing shown from the steps B221 to B226 of FIG. 2A.

When the sensor node 150 receives a history data request command, the processing shown in FIG. 12 is started (step 1201).

The received history data request command specifies the sequence number 207 of history data which is the object of the request. For example, the command shown in the step 413 of FIG. 4 specifies the sequence numbers 207 of #4 to #7 (i.e., from "0004" to "0007"). The sensor node 150 determines whether or not, among the specified sequence numbers 207, there is a sequence number 207 for which processing has not yet terminated (step 1202). (i.e., whether or not there is a sequence number 207 for which corresponding response data has still not been generated).

In the step 1202, when it is determined that there is a sequence number 207 for which processing has not yet terminated, among the sequence numbers 207 for which processing has not yet terminated, the sensor node 150 is selected as the processing object of the leading sequence number 207. Hereafter, the sequence number 207 of the processing object is referred to as "this sequence number", and the observation data to which this sequence number was assigned is referred to as "this data." The sensor node 150 determines whether or not this sequence number is stored in the data storage unit 206 (step 1203).

In the step 1203, when it is determined that this sequence number is not stored in the data storage unit 206, this data is not stored in the data storage unit 206. Therefore, the sensor node 150 cannot return this data. In this case, the sensor node 150 generates response data showing that this data does not exist (step 1206). The sensor node 150 then terminates processing of this sequence number, and to perform processing for the following sequence number, returns to the step 1202.

On the other hand, in the step 1203, when it is determined that this sequence number is stored in the data storage unit 206, this data is stored in the data storage unit 206. In this case, the sensor node 150 determines whether the time stamp 208 of this data has been time synchronized (step 1204).

The power supply 1105 of the sensor node 150 is a battery. The value of the RTC 1107 is reset when the battery is replaced. Subsequently, the RTC 1107 does not show the exact time until the time is synchronized by the management server 100. Whether or not it has been time synchronized can be determined by referring to a flag added to the observation data (FIGS. 21A and 21B).

In the step 1204, when it is determined that it is not time synchronized, the value of the time stamp 208 of this data is not precise. In this case, since this data cannot be used, after the step 1206 is performed, processing returns to the step 1202.

On the other hand, in the step 1204, when it is determined that it is time synchronized, the sensor node 150 generates response data (step 1205). Specifically, this data is added to the response data. The sensor node 150 then terminates processing of this sequence number, and to perform processing for the following sequence number, returns to the step 1202.

In the step 1202, when it is determined that there is no sequence number for which processing has not terminated, generation of response data corresponding to all the sequence numbers 207 specified by a history data request command is complete. In this case, the sensor node 150 transmits the generated response data (step 1207), and terminates processing. The step 1207 corresponds to the step B226 of FIG. 2A, and the step 420 of FIG. 4.

FIG. 13A is a diagram of the latest observation data managed by the sensor network management server 100 according to an embodiment of the invention.

The latest observation data received from each of the sensor nodes 150 is stored in the latest data storage manager 302 of the sensor network management server 100. FIG. 13A shows an example of the latest observation data stored in the latest data storage manager 302 at a certain time.

The latest observation data stored in the latest data storage manager 302 includes a node identifier (ID) 1301, time stamp 1302, and observed value 1303. Although the latest observation data may also contain a sequence number, it is not required.

The node ID 1301 is an identifier of the sensor node 150 of the transmitting source of the stored observation data. As the node ID 1301, an IEEE escape address may be used.

The time stamp 1302 is assigned to the observation data by the sensor node 150 of the transmitting source. The time stamp 1302 corresponds to the time stamp 208 of FIG. 2B.

The observed value 1303 is a value of environmental information observed by the sensor node 150. The observed value 1303 of this embodiment is a temperature and humidity observed by the sensor node 150.

In FIG. 13A, for example, "2006/7/16 10:45:01" and "25.6° C. 61%" are stored, respectively, as the time stamp 1302 and observed value 1303 corresponding to a value "0001000200030004" of the node ID1301. In this case, the observation data finally received from the sensor node 150 identified by the node ID "0001000200030004", is temperature "25.6° C." and humidity "61%" which were observed at 10:45:01 seconds on Jul. 16, 2006.

FIG. 13B is a diagram of history data managed by the sensor network management server 100 according to an embodiment of the invention.

The history of observation data, i.e., history data, received from each of the sensor nodes 150 is stored in a database managed by the history data storage manager 303 of the sensor network management server 100. FIG. 13B shows an example of the observation data received from the sensor node 150 identified by the node ID "0001000200030004." When the sensor network management server 100 receives observation data from plural sensor nodes 150, the same table as FIG. 13B is created for each sensor node, and is managed by the history data storage manager 303.

The history data of this embodiment comprises a sequence number 1311, time stamp 1312, and observed value 1313.

The sequence number 1311 and time stamp 1312 are assigned to observation data by the sensor node 150 of the transmitting source. The sequence number 1311 and time stamp 1302 correspond to the sequence number 207 and time stamp 208 of FIG. 2B.

The observed value 1313 is a value of environmental information observed by the sensor node 150. The observed value 1313 of this embodiment is a temperature and humidity observed by the sensor node 150.

In FIG. 13B, for example, "2006/7/14 18:00:01" and "28.0° C. 60%" are stored, respectively, as the time stamp 1312 corresponding to a value "0000" and observed value 1313 of the sequence number 1311. In this case, the temperature and humidity observed by the sensor node 150 at 18:00:01 seconds on Jul. 14, 2006 are "25.6° C." and "61%", respectively.

In the example of FIG. 13B, observation data from "0004" to "0007" is missing for the sequence number 1311. This means that the sensor network management server 100 was not able to receive observation data #4 to #7.

FIG. 14 is a diagram of missing data sequence numbers managed by the missing data manager 305 according to an embodiment of the invention.

The missing data manager 305 manages the sequence numbers of missing observation data. Specifically, for example, the missing data manager 305 examines missing history data in step B324 of FIG. 3. As a result, the sequence numbers of missing observation data are acquired.

The information managed by the missing data manager 305 comprises at least a node ID 1401 and missing sequence number 1402, as shown in FIG. 14.

The node ID 1401 is an identifier of each of the sensor nodes 150.

The missing sequence number 1402 is a sequence number of observation data which is missing from among the history data corresponding to each of the sensor nodes 150.

For example, according to FIG. 13B, in the history data of the sensor node 150 whose node ID is "0001000200030004", observation data from "0004" to "0007" is missing for the sequence number 1311. In this case, in FIG. 14, values from "0004" to "0007" are included in the missing sequence number 1402 corresponding to a value "0001000200030004" of the node ID 1401.

In the step B330 of FIG. 3, when observation data (history data) for which the sequence numbers are "0004" to "0007" is compensated, in the step B311, the values from "0004" to "0007" are deleted from the missing sequence number 1402.

If the sensor network management server 100 reboots due to some reason, the missing data manager 305 is reset, and as a result, all the data shown in FIG. 14 may be lost. At this time, the missing data manager 305 may acquire and store the missing sequence number 1402 by looking up the history data managed by the history data storage manager 303.

Next, the data display screen will be described by referring to FIG. 15A to FIG. 17B. These display screens are displayed on a display (not shown) of the management client 160 or operating client 165.

Figures 15A, 15B:
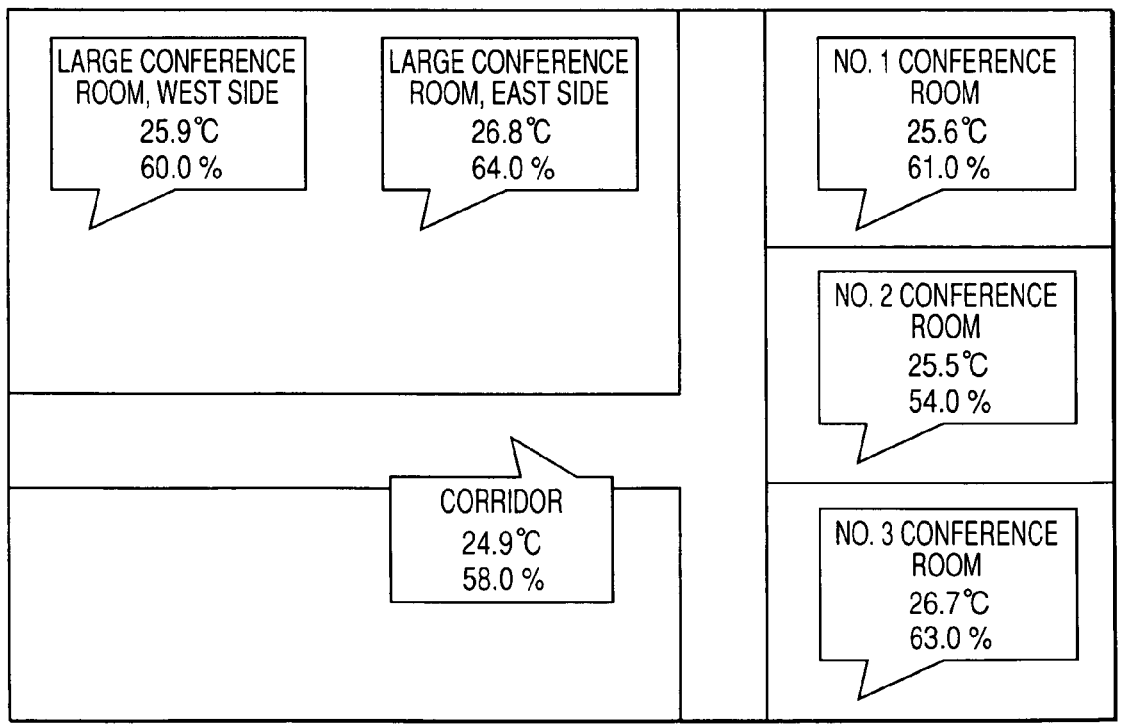
FIG. 15A is an example of a diagram of a screen displaying the latest observation data in tabular form according to an embodiment of the invention.
FIG. 15B is an example of a diagram of a screen displaying the latest observation data in map form according to an embodiment of the invention.

FIG. 15A is a diagram of a screen displaying the latest observation data in tabular form according to an embodiment of the invention. This display form is a screen displayed when a user specifies tabular form by a latest data request or a menu displaying the latest observation data such as for example "on-site understanding" in tabular form, and the latest observation data stored in the latest data storage manager is displayed.

Specifically, FIG. 15A shows an example where the latest observation data shown in FIG. 13A is displayed. The display screen of FIG. 15A comprises a node number 1501, node designation 1502, temperature 1503, humidity 1504, and observation time 1505. A node number 1501 and node name 1502 are information identifying each of the sensor nodes 150 which is a display object. The values "1" to "6" of the node number 1501 correspond to "0001000200030009" to "0001000200030004" of the node ID 1301 of FIG. 13A, respectively.

The node name 1502 shows a point to which each of the sensor nodes 150 is attached. In the example of FIG. 15A, the sensor nodes 150 corresponding to the values "1" to "6" of the node number 1501 are installed in the first conference room, second conference room, third conference room, main conference room east side, main conference room west side, and the corridor. The node name 1502 may be the name of a person or thing to which the sensor node 150 is attached, or another name easily managed by the user.

The temperature 1503 and humidity 1504 correspond to the observed value 1303 of FIG. 13A.

The observation time 1505 corresponds to the time stamp 1302 of FIG. 13A.

FIG. 15B is a diagram of a screen displaying the latest observation data in map form according to an embodiment of the invention. This display form is a screen displayed when a user specifies map form by a latest data request or a menu displaying the latest observation data such as for example "general on-site understanding" in map form, and the latest observation data stored in the latest data storage manager is displayed in the same way as in FIG. 15A.

FIG. 15B shows an example displaying the same observation data as FIG. 15A in map form. As shown in FIG. 15B, a flowchart is displayed on a screen. The latest observation data (i.e., temperature and humidity) observed by the sensor node and the node name are displayed at a position in which the sensor node 150 is installed.

Figure 16:
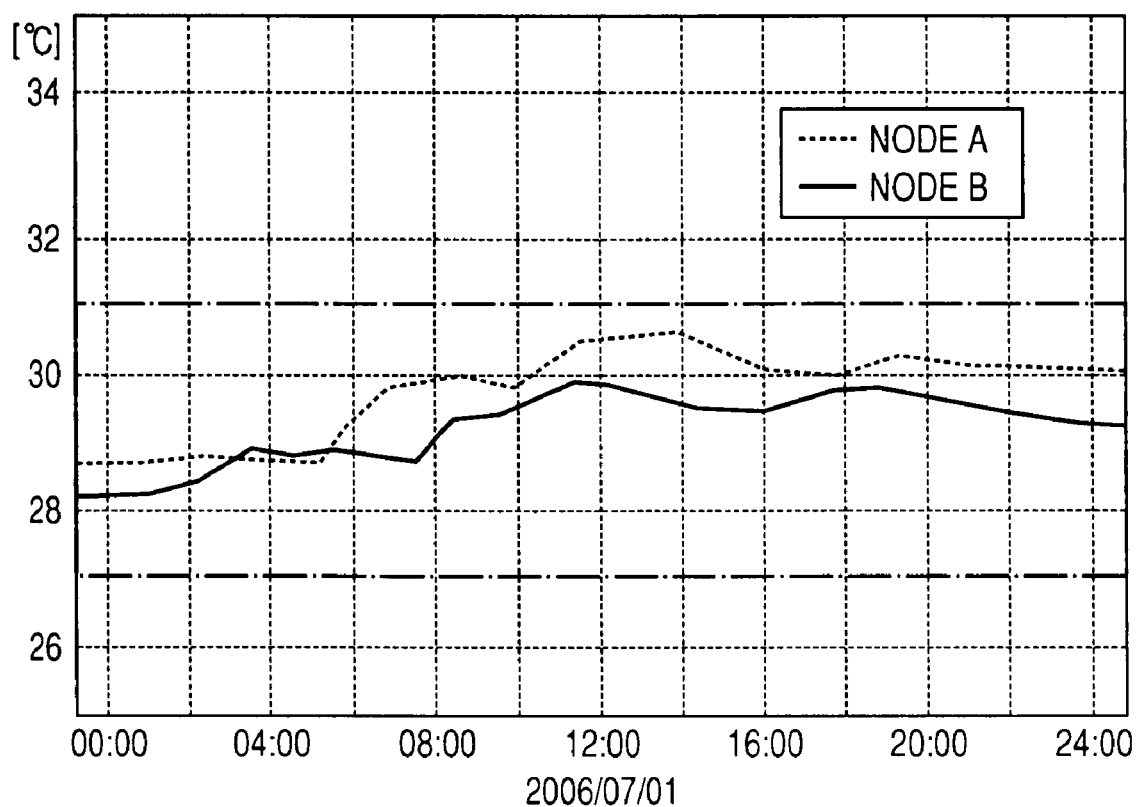
FIG. 16 is an example of a diagram of a screen displaying history data in graphical form according to an embodiment of the invention.

FIG. 16 is a diagram of a screen displaying history data in graphical form according to an embodiment of the invention. This display form is a screen displayed when a user specifies graphical form by a latest data request or a menu displaying the latest observation data such as for example "generation of daily report" in graphical form, and the history data stored in the history data storage manager is displayed.

FIG. 16 shows a screen displaying, as an example, all the history data observed by the two sensor nodes 150 (node A and node B) on Jul. 1, 2006. In this example, the history data displayed is temperature. In this case, all the temperatures observed from 0:00 on Jul. 1, 2006 to 24:00 on the same day by the two sensor nodes 150 is displayed by two broken line graphs.

In FIG. 16, in generating a daily report for example, it is assumed that history data is displayed from 0:00 to 24:00 on a certain day, but the user can specify an arbitrary period in which to display history data.

Figure 17A:
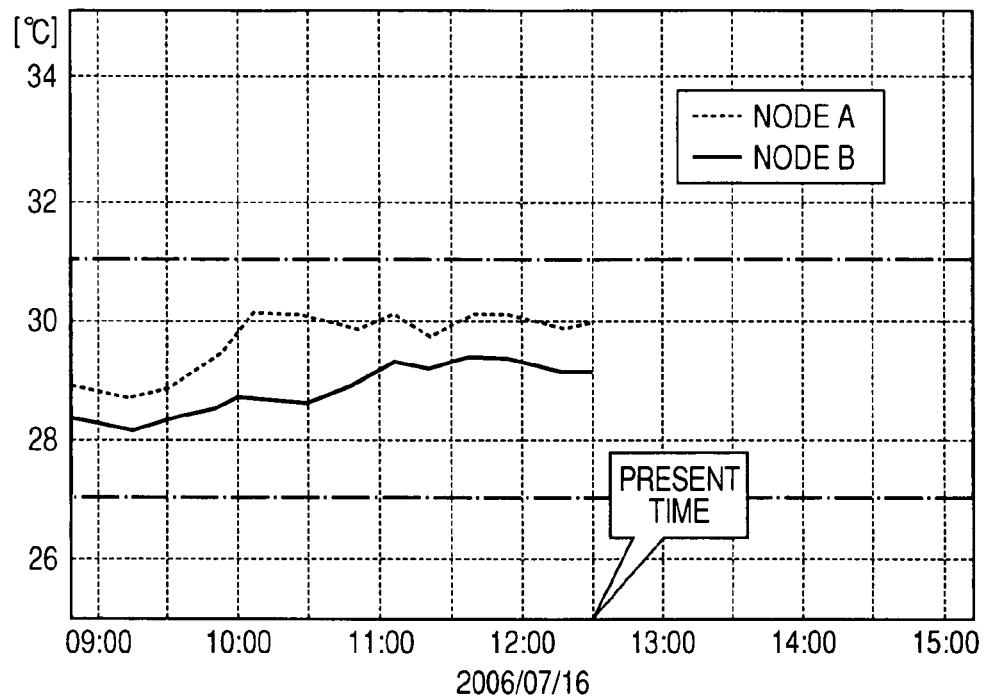
FIG. 17A is an example of a diagram of a screen displaying the latest data with missing data according to an embodiment of the invention.

FIG. 17A is a diagram of a screen displaying the latest observation data and history data in graphical form according to an embodiment of the invention. This display form is a screen displayed when a user specifies graphical form by a latest data request or a menu displaying the latest observation data such as for example "on-site understanding up to the present" in graphical form, and the observation data stored in the latest data storage manager and history data storage manager is displayed.

FIG. 17A shows a screen displaying, as an example, temperature observed by the two sensor nodes 150 (node A and node B). In this example, the present time is 12:30 on Jul. 16, 2006. In the example of FIG. 17A, the temperature observed by the two sensor nodes 150 from Jul. 16, 2006, 9:00 up to the present time (12:30 on the same day), is read by the history data storage manager and displayed by two broken line graphs. After this, the latest observation data is read from the latest data storage manager and additional observation data is displayed. Due to this, history data of high quality already stored in the history data storage manager is displayed, and subsequently, the situation can be grasped in real-time with the latest observation data.

The reason why there is missing data in FIG. 17A is because the user is provided with history data from which data is missing due to the timing of the history data request from the user described in FIGS. 6, 8, and 10. Alternatively, as described in FIG. 3, when compensating missing data with a user request as a trigger, the data storage manager 303 receives a history data request from the external request receiver 301, and the stored history data from which data is missing is transmitted immediately or after a predetermined time to the external request receiver 301, and provided to the user.

Figure 17B:
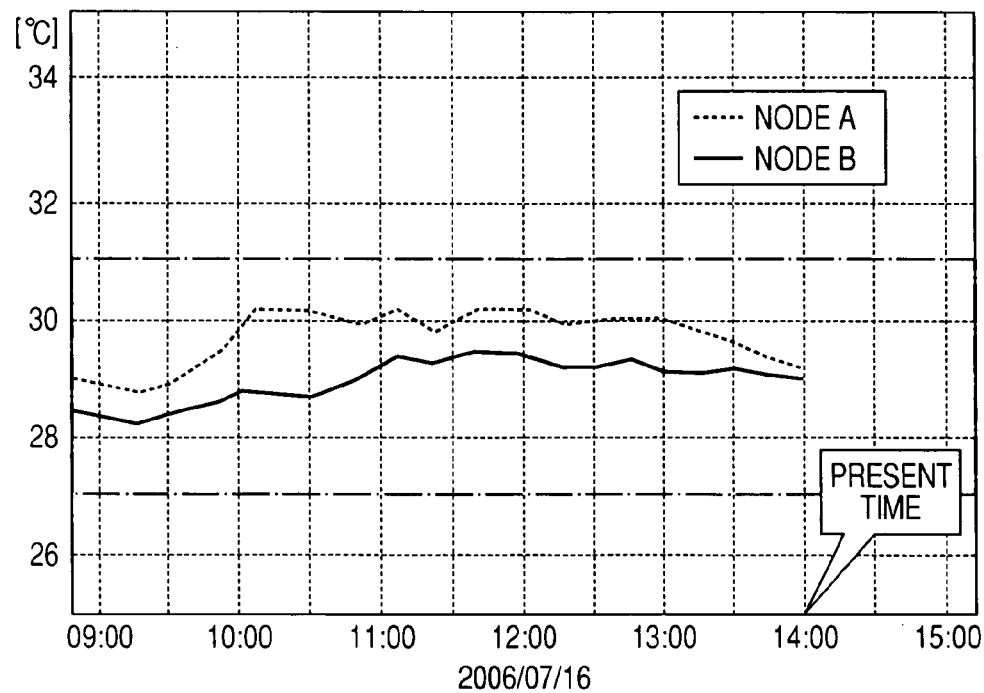
FIG. 17B is an example of a diagram of a screen displaying the latest data without missing data according to an embodiment of the invention.

FIG. 17B, similarly to FIG. 17A, is a diagram of a screen displaying the latest observation data and history data in graphical form according to an embodiment of the invention. This display form also is a screen displayed when a user specifies graphical form by a latest data request or a menu displaying the latest observation data such as for example "on-site understanding up to the present" in graphical form, and the observation data stored in the latest data storage manager and history data storage manager is displayed. In the example of FIG. 17B, the temperature observed after 1.5 hours has elapsed from FIG. 17A up to the present time (14:00 on the same day) is displayed, processing is performed to compensate missing data for 1.5 hours, and history data without any missing data is displayed.

Next, a command or an event handled in the sensor network management server 100 will be described referring to FIG. 18 to FIG. 20.

FIG. 18 is a diagram of a single observation event handled in the sensor network management server 100 according to an embodiment of the invention.

A single observation event is an event generated when the sensor network management server 100 receives real-time data observed in the sensor node 150. The observation data of this embodiment is transmitted by wireless communications based on a standard such as ZigBee from the sensor node 150 to the gateway node 130. The observation data is converted into XML (Extensible Markup Language) format, for example in the ZigBee adapter 112 or profiled adapter 106. The single observation event shown in FIG. 18 is transmitted for example in the step A312 of FIG. 3.

The example of FIG. 18 shows that the temperature "23° C." measured at 10:02:01 seconds on Jan. 1, 2006 by the sensor node 150 whose node ID is "0001000200030004", is transmitted together with the sequence number "001F" via the gateway node 130 having an identifier "133.xxx.yyy.zzz: 5555".

FIG. 19 is a diagram of a data request command handled in the sensor network management server 100 according to an embodiment of the invention.

The history data request command shown in FIG. 19 is an example of a command transmitted in, for example, the step B325 of FIG. 3. This command is described by XML.

The example of FIG. 19 shows a command which requests transmission of history data of sequence numbers "0010" and "0029" to "002B", to the sensor node 150 whose node ID is "0001000200030004."

FIG. 20 is a diagram of a bulk transfer event handled in the sensor network management server 100 according to an embodiment of the invention.

A bulk transfer event is an event generated when the sensor network management server 100 receives history data transmitted in response to a history data request command. The bulk transfer event shown in FIG. 20 is transmitted for example in the step B328 of FIG. 3.

Specifically, FIG. 20 shows, as an example, a bulk transfer event generated in the sensor network management server 100 which received a response to the command shown in FIG. 19 from the sensor node 150.

The example of FIG. 20 shows that history data corresponding to the sequence number "0010" did not exist in the sensor node 150. Since the capacity of the nonvolatile memory 1104 is limited, old history data may be overwritten with new history data. As a result, the requested history data may not exist in the sensor node 150. In such a case, the sensor network management server 100 does not issue a further history data request command for a sequence number (in the example of FIG. 20, "0010") which did not exist.

The example of FIG. 20 shows that the observed values corresponding to the sequence numbers "0029", "002A", and "002B" are temperature "23.0° C.", "22.0° C.", and "24.0° C.", respectively. The example of FIG. 20 shows that the time stamps corresponding to sequence numbers "0029", "002A", and "002B" are "10:00:01 seconds on Jan. 1, 2006", "10:01:01 seconds on Jan. 1, 2006", and "10:02:01 seconds on Jan. 1, 2006", respectively.

Next, the time synchronization processing of the sensor node 150 will be described referring to FIGS. 21A and 21B.

It may be expected that the RTC 1107 of the sensor node 150 will normally always hold the exact time (i.e., a time synchronized with the time managed by the sensor network management server 100). However, the time held by the RTC 1107 may be reset. For example, when the power supply 1105 is a battery, the RTC 1107 is reset in the case of battery replacement. The sensor node 150 then acquires a time entry from the sensor network management server 100, and synchronizes the time of the RTC 1107 with the acquired time. The RTC 1107 does not hold the exact time until such time synchronous processing has been performed. Hence, after replacing the battery, since it is not synchronized with the time managed by the sensor network management server 100, the time stamp of observation data observed before time synchronization processing was performed cannot be used.

However, when the sensor node 150 acquires a time entry from the sensor network management server 100, based on the difference of the acquired time entry and the time held by the RTC 1107 at the time of acquisition, the inaccurate (i.e., not synchronized with the time managed by the sensor network management server 100) time stamp already stored as observation data, can be corrected. The time stamp is corrected specifically by adding the aforesaid difference to the inaccurate time stamp already stored. After correction, the time stamp can be used.

FIG. 21A is a diagram of the data stored in the data storage unit 206 of the sensor node 150 before time synchronization processing is performed according to an embodiment of the invention.

The data shown in FIG. 21 is obtained by adding a time synchronization flag 2104 to the data shown in FIG. 2B. In FIG. 21A, since the sequence number 2101, time stamp 2102 and observed value 2103 are respectively identical to the sequence number 207, time stamp 208 and observed value 209 of FIG. 2B, their description is omitted. However, since time synchronization processing has not yet been performed, an exact value is not stored in the time stamp 208 of FIG. 21A.

In this embodiment, the time held by the RTC 1107 of the sensor node 150 is 0:00:00 seconds on Jan. 1, 2000 due to reset. Hence, if the RTC 1107 is reset, operation will start from the reference point of 0:00:00 seconds on Jan. 1, 2000.

The time synchronization flag 2104 is a flag which shows whether or not time synchronization processing was performed. When the value of the time synchronization flag 2104 is "0", time synchronization processing has not yet been performed. Hence, the value of the time stamp corresponding to the time synchronization flag 2104 is not synchronized with the time managed by the sensor network management server 100. On the other hand, when the value of the time synchronization flag 2104 is "1", time synchronization processing has already been performed. Hence, the value of the time stamp corresponding to the time synchronization flag 2104 is synchronized with the time managed by the sensor network management server 100.

Even if time synchronization processing has not yet been performed, the sensor node 150 observes environmental information according to a request from the RTC 1107, and generates observation data. However, the sensor node 150 prohibits transmitting observation data corresponding to a time stamp which is not synchronized with the time managed by the sensor network management server 100. In other words, when time synchronization processing has not yet been performed, the sensor node 150 does not transmit observation data as real-time data, but stores it in the data storage unit 206.

Also, even if transmission of observation data for which the value of the time synchronization flag 2104 is "0", is requested by a history data request command, the sensor node 150 does not transmit the observation data. Alternatively, the sensor node 150 may transmit the observation data, and transmit the difference between the time at which the history data request command was received, and the time when the observation data was observed. In this case, the sensor network management server 100 can compute an exact time stamp based on that difference.

In the example of FIG. 21A, since time synchronization processing has not yet been performed, the value of the time synchronization flag 2104 is "0". As described above, observation data for which the value of the time synchronization flag 2104 is "0" cannot be used. This observation data is the object of the time synchronization processing shown in FIG. 21B.

FIG. 21B is a diagram of data stored in the data storage unit 206 of the sensor node 150 after time synchronization processing was performed according to an embodiment of the invention.

FIG. 21B shows an example of corrected data acquired by performing time synchronization processing on the data shown in FIG. 21A.

For example, when the RTC 1107 holds "0:10:10 seconds on Jan. 1, 2000" as a time entry, when the sensor node 150 acquires the time entry "10:10:01 seconds on Jul. 16, 2006" from the sensor network management server 100, the difference of these two times is "6 years, 6 months, 15 days, 9 hours, 59 minutes and 51 seconds."

By the time the sensor node 150 receives the time entry transmitted from the sensor network management server 100, a delay may occur in the IP network 180 and PAN 185. In this case, the aforesaid time entry "10:10:01 seconds on Jul. 16, 2006" may be a corrected value obtained by adding the delay time to the time entry transmitted from the sensor network management server 100.

In this case, by adding the aforesaid difference to the time stamps "0:00:10 seconds on Jan. 1, 2000", "0:05:10 seconds on Jan. 1, 2000" and 0:10:10 seconds on Jan. 1, 2000" corresponding to the sequence numbers "0000", "0001", "0002", precise time stamps "10:00:01 seconds on Jul. 16, 2006", "10:05:01 seconds on Jul. 16, 2006" and 10:10:01 seconds on Jul. 16, 2006" can be computed. From these computed values, the time stamp 2102 can be corrected.

When the time stamp 2102 is corrected, the value of the time synchronization flag 2104 is updated to "1." Observation data for which the value of the time synchronization flag 2104 is "1" can be used. Hence, the sensor node 150 transmits observation data generated after time synchronization processing was performed as the latest observation data. The sensor node 150, when transmission of observation data for which the value of the time synchronization flag 2104 is "1" is requested by a history data request command, transmits the observation data.

When the sensor node 150 was reset and observation data for which the value of the time synchronization flag 2104 is "0" is already stored, it is impossible to compute the exact time stamp 208 of the observation data by subsequent time synchronization processing. Therefore, such observation data is cancelled.

The above time synchronization processing may be performed not only when the sensor node 150 is reset, but when an error arises between the time held by the RTC 1107, and the time managed by the sensor network management server 100.

Next, the appearance of the sensor node 150 will be described referring to FIGS. 22A and 22B.

Figure 22A:
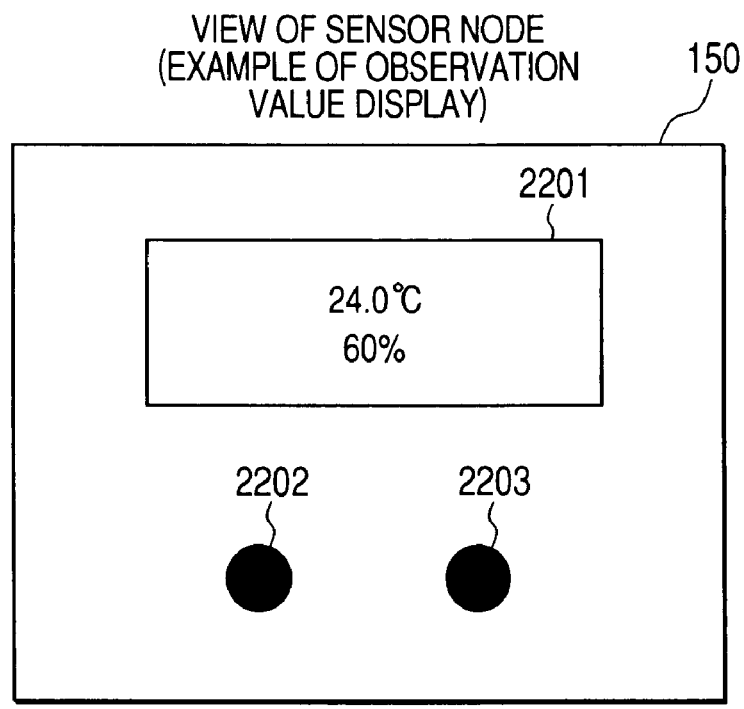
FIG. 22A is an example of a diagram of the appearance of a sensor node in which an observed value was displayed according to an embodiment of the invention.

FIG. 22A is a diagram showing the appearance of the sensor node 150 in which an observed value was displayed according to an embodiment of the invention.

The sensor node 150 of this embodiment is provided with a data display unit 2201, manual operation button 2202, and manual operation button 2203.

The data display unit 2201 is, for example, a liquid crystal display screen. According to operation of, e.g., the manual operation button 2202, data is displayed on the data display part. Alternatively, data may be displayed according to a command received from the sensor network management server 100. For reducing power consumption, this display disappears automatically after a predetermined time has elapsed. However, the display may be maintained when the data display unit is an element which does not consume power like electronic paper.

In the example of FIG. 22A, the latest observed values, i.e., temperature and humidity, are displayed on the data display unit 2201. For example, the latest observed values may be displayed on the data display unit 2201 by operating the manual operation button 2202. Alternatively, a stored previous observed value of temperature or humidity, the maximum or minimum of stored data, or an average, may be displayed by operating the manual operation button 2202. Alternatively, information (for example, information or a PAN identifier relating to a channel) about the sensor network may be displayed by operating the manual operation button 2202. These displays may be changed over whenever the manual operation button 2202 is operated.

Figure 22B:
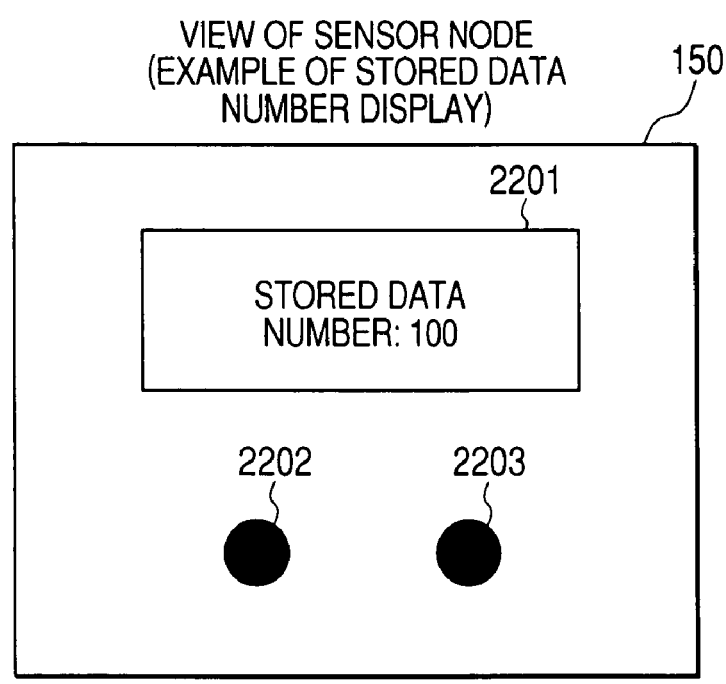
FIG. 22B is an example of a diagram of the appearance of a sensor node in which a number of stored data was displayed according to an embodiment of the invention.

FIG. 22B is a diagram of the appearance of the sensor node 150 in which the number of stored data was displayed 150 according to an embodiment of the invention.

FIG. 22B shows an example in which the number of stored data was displayed on the data display unit 2201 of the same sensor node 150 as in FIG. 22A. The number of stored data is the number of observation data (history data) stored in the data storage unit 206 of the sensor node 150. For example, the number of stored data may be displayed on the data display unit 2201 by operating the manual operation button 2203. Alternatively, the range of the time stamp 208 of observation data or the range of the sequence number 207 stored in the data storage unit 206 may be displayed by operating the manual operation button 2203. These displays may be changed over each time the manual operation button 2203 is operated.

Alternatively, data displayed on the data display unit 2201 may be determined by a combined operation of the manual operation buttons 2202 and 2203. The sensor node 150 may be provided with still more manual operation buttons.

The process flow in this embodiment may be a program which is executed by reading the program with a computer.

Some examples of the invention have been described, but the invention is not to be construed as being limited in any way by these examples, and it will be obvious to those skilled in the art that various modifications and combinations thereof are possible.

According to the above embodiment of the invention, the sensor node 150 has a nonvolatile memory 1104, and observation data containing environmental information is transmitted to the sensor network management server 100, and is also stored as history data in the nonvolatile memory 1104. The sensor node 150 enters the sleeping state without waiting for an ACK the from sensor network management server 100.

The sensor network management server 100 independently manages a memory which stores the latest observation data, and a database which manages the history of observation data (i.e., history data). The sensor network management server 100, when data is missing from the history data, requests transmission of history data from the sensor node 150.

The sensor node 150 transmits history data stored in the nonvolatile memory 1104 to the sensor network management server 100 as requested. As a result, the sensor network management server 100 can acquire perfect history data without any data missing.

Therefore, according to this embodiment of the invention, since the sensor node 150 does not wait for an ACK from the sensor network management server 100, the time of the activated state is thereby shortened and power consumption is thereby reduced. As a result, the cost of battery replacement in the sensor node 150 can be reduced.

Further, in the sensor network management server, since the latest observation data and history data are managed separately, and the history data stored in the sensor node 150 can be acquired as needed, the sensor network management server 100 can provide the user with the latest observation data and perfect history data.

Even if the user cannot acquire the latest observation data, he can acquire perfect history data without any data missing later. If there are plural missing data at this time, these plural missing data can be transmitted together. Hence, power consumption for transmission is reduced as compared with the prior art method of resending data each time transmission fails.

The sensor network management server 100 can use the history data stored in the nonvolatile memory 1104 of the sensor node 150 as a backup. For example, if the content of the database managed by the history data storage manager 303 disappears, the previous observation data can be reconstructed from the history data stored in the nonvolatile memory 1104.

What is claimed is:
1. A sensor network system comprising:
a sensor terminal, which alternates between an activated state and a sleeping state, collects and transmits observation data by wireless communications in said activated state and stops collecting and transmitting observation data in said sleeping state; and a management server, which includes:
- a latest data storage manager which manages a set of latest observation data of observation data received from said sensor terminal;
- a history data storage manager which manages history data of the observation data received from said sensor terminal from a set of previous observation data received from said sensor terminal to said set of latest observation data; and
- a missing data manager which manages loss of said history data indicating missing observation data transmitted from said sensor terminal and not received by said management server,
- wherein said missing data manager sends a retransmission request to said sensor terminal to retransmit the missing observation data that was not received by said management server based on a predetermined rule, wherein said sensor terminal, upon receiving said retransmission request from said management server, retransmits said missing observation data to said management server, and wherein, in case that a request for observation data is received from user terminal, at least one of the set of latest observation data managed by said latest data storage manager and the history data managed by said history data storage manager is output to said user terminal according to a type of said request for observation data received from said user terminal.

2. The sensor network system according to claim 1,
wherein said sensor terminal has a wireless communications circuit which performs communication, and
wherein in case that said observation data is transmitted, power supply to said wireless communications circuit is stopped regardless of whether or not an acknowledgement from said management server has been received.

3. The sensor network system according to claim 1,
wherein said observation data contains a sequence number showing a sequence in which said observation data was acquired, and
wherein, in case that the sequence numbers of the observation data stored as history data are not continuous, said missing data manager determines that data is missing from said history data.

4. The sensor network system according to claim 3,
wherein, in case that data is missing from said stored history data, said missing data manager determines whether or not the difference between said sequence number of the oldest observation data among the missing observation data, and said sequence number of said latest observation data, exceeds a predetermined threshold, and
wherein, in case that it is determined that the difference of said sequence numbers exceeds the predetermined threshold, said missing data manager requests transmission of said missing observation data.

5. The sensor network system according to claim 1,
wherein, in case that a request for observation data is received, said missing data manager determines whether or not data is missing from said history data, and
wherein, in case that it is determined that some data is missing from said history data, said missing data manager requests transmission of said missing observation data to said sensor terminal.

6. The sensor network system according to claim 1,
wherein said missing data manager determines whether or not data is missing from said history data at a predetermined timing, and wherein, in case that it is determined that some data is missing from said history data, said missing data manager requests transmission of said missing observation data to said sensor terminal.

7. The sensor network system according to claim 1,
wherein said missing data manager receives a heartbeat signal transmitted at a predetermined interval from said sensor terminal,
wherein said missing data manager determines whether or not data is missing from said history data based on the receive state of said heartbeat signal, and
wherein, in case that it is determined that there is data missing from said history data, said missing data manager requests transmission of said missing observation data to said sensor terminal.

8. The sensor network system according to claim 7,
wherein said sensor terminal transmits said observation data at a predetermined interval,
wherein said missing data manager uses said observation data transmitted from said sensor terminal as said heartbeat signal,
wherein, in case that said heartbeat signal is not received at said predetermined interval, said missing data manager determines that some data is missing from said history data, and
wherein, in case that it is determined that some data is missing from said history data, after receiving said heartbeat signal, said missing data manager requests transmission of said missing observation data to said sensor terminal.

9. The sensor network system according to claim 1,
wherein the observation data stored in the memory of said sensor terminal is associated with a timestamp showing the time at which this observation data was acquired, and a time synchronization flag showing whether or not the value of said timestamp is synchronized with the timing managed by said management server, and
wherein said sensor terminal prohibits transmission of observation data associated with a time synchronization flag showing that the value of the timestamp is not synchronized with the timing managed by said management server.

10. The sensor network system according to claim 9,
wherein, in case that it acquires timing information showing the time managed by said management server, said sensor terminal executes a timing synchronization processing which synchronizes the timing held by said sensor terminal with said timing information,
wherein said sensor terminal computes the difference between a timing showing said timing information and a timing held at a time when said sensor terminal acquired said timing information before said timing synchronization processing was executed,
wherein said sensor terminal adds said computed difference to the timestamp associated with the observation data stored in said memory, and
wherein said sensor terminal makes said timing synchronization flag associated with the timestamp to which said difference was added, a value showing that the value of said timestamp is synchronized with the timing managed by said management server.

11. The sensor network system according to claim 1, wherein said management server outputs at least one of the latest observation data damaged by said latest data storage manager, and history data in which losses were compensated and managed by said history data storage manager, based on the association of at least one of the type of request with said latest data storage manager or said history data storage manager.

12. The sensor network system according to claim 1, wherein, in case that said observation data request is a requesting the expression of said latest observation data and said history data in graphical form, said management server outputs the history data stored in said history data storage manager, and after outputting said history data, outputs said latest observation data stored in said latest data storage manager.

13. The sensor network system according to claim 12,
wherein said server displays said latest observation data and said history data in graphical form on a connected display unit, and
wherein the time at which said latest observation data and said history data were acquired is taken as the horizontal axis.

14. The sensor network system according to claim 1, wherein said management server displays the latest observation data together with information identifying said sensor terminal in tabular form, on a connected display unit.

15. The sensor network system according to claim 1, wherein said management server displays said latest observation data on a map showing the position of said sensor terminal, on a connected display unit.

16. The sensor network system according to claim 1, wherein said sensor terminal alternates between said activated state and said sleeping state at a predetermined time interval.

17. The sensor network system according to claim 1, wherein the type of said request is a type of display request from a user.

18. The sensor network system according to claim 1, wherein the loss of said history data is caused by a wireless communications problem.

19. The sensor network system according to claim 1, wherein said sensor terminal collects environmental information in real time.

* * * * *